US012694495B2

(12) United States Patent
Chen et al.

(10) Patent No.: US 12,694,495 B2
(45) Date of Patent: Jul. 28, 2026

(54) IMAGE PROCESSING METHOD AND RELATED DEVICE THEREOF

(71) Applicant: Honor Device Co., Ltd., Shenzhen (CN)

(72) Inventors: Ke Chen, Shenzhen (CN); Bin Xiao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 267 days.

(21) Appl. No.: 18/574,139

(22) PCT Filed: Aug. 18, 2022

(86) PCT No.: PCT/CN2022/113424
§ 371 (c)(1),
(2) Date: Dec. 26, 2023

(87) PCT Pub. No.: WO2023/124123
PCT Pub. Date: Jul. 6, 2023

(65) Prior Publication Data
US 2024/0320794 A1　　Sep. 26, 2024

(30) Foreign Application Priority Data

Dec. 31, 2021　(CN) .......................... 202111677018.1

(51) Int. Cl.
*G06K 9/00*　　　(2022.01)
*G06T 5/50*　　　(2006.01)
(Continued)

(52) U.S. Cl.
CPC .................. *G06T 5/90* (2024.01); *G06T 5/50* (2013.01); *G06T 5/92* (2024.01); *G06T 2200/24* (2013.01);
(Continued)

(58) Field of Classification Search
CPC ................ G06N 20/00; G06T 2200/24; G06T 2207/10016; G06T 2207/10024;
(Continued)

(56) References Cited

U.S. PATENT DOCUMENTS

| 11,151,702 B1 * | 10/2021 | Tico | .......................... G06T 5/60 |
| 11,178,368 B2 * | 11/2021 | Gera | .................... H04N 9/3182 |

(Continued)

FOREIGN PATENT DOCUMENTS

| CN | 106412448 A | 2/2017 |
| CN | 110958401 A | 4/2020 |

(Continued)

OTHER PUBLICATIONS

Luan, Fujun, et al. "Deep photo style transfer." Proceedings of the IEEE conference on computer vision and pattern recognition. 2017. (Year: 2017).*

(Continued)

*Primary Examiner* — Hadi Akhavannik
(74) *Attorney, Agent, or Firm* — Slater Matsil, LLP

(57) ABSTRACT

This application relates to the field of image processing, and provides an image processing method and a related device thereof. The method includes: displaying a first interface, where the first interface includes a first control; detecting a first operation on the first control; obtaining a plurality of frames of exposure images in response to the first operation; and performing style transfer on the plurality of frames of exposure images to obtain a target image.

20 Claims, 10 Drawing Sheets

(51) Int. Cl.
  G06T 5/90    (2024.01)
  G06T 5/92    (2024.01)

(52) U.S. Cl.
  CPC .............. *G06T 2207/10024* (2013.01); *G06T 2207/10144* (2013.01); *G06T 2207/20081* (2013.01); *G06T 2207/20084* (2013.01); *G06T 2207/20221* (2013.01)

(58) Field of Classification Search
  CPC . G06T 2207/10144; G06T 2207/20081; G06T 2207/20084; G06T 2207/20221; G06T 5/50; G06T 5/70; G06T 5/90; G06T 5/92
  See application file for complete search history.

(56)            References Cited

U.S. PATENT DOCUMENTS

| | | |
|---|---|---|
| 2009/0080791 A1 | 3/2009 | Chen et al. |
| 2011/0050950 A1 | 3/2011 | Nomura |
| 2015/0195441 A1 | 7/2015 | Chen et al. |
| 2020/0265567 A1* | 8/2020 | Hu ........................... G06N 3/09 |
| 2020/0357096 A1* | 11/2020 | Gao ......................... G06T 5/20 |
| 2021/0152735 A1* | 5/2021 | Zhou ...................... H04N 23/64 |
| 2021/0286975 A1 | 9/2021 | Sun et al. |
| 2022/0207680 A1 | 6/2022 | Wang et al. |

FOREIGN PATENT DOCUMENTS

| | | |
|---|---|---|
| CN | 111418201 A | 7/2020 |
| CN | 112529775 A | 3/2021 |
| CN | 113824873 A | 12/2021 |

OTHER PUBLICATIONS

Du Lin et al: "High Dynamic Range Image Fusion Algorithm for Moving Targets", Acta Optica Sinica, vol. 37, No. 4, Apr. 2017, 9 pages.

Lee Sang-Hoon et al.: "Exposure-Structure Blending Network for High Dynamic Range Imaging of Dynamic Scenes", IEEE Access, IEEE, USA, vol. 8, Jun. 24, 2020 (2020-06-24), p. 117428-117438.

Johnson Justin et al.: "Perceptual Losses for Real-Time Style Transfer and Super-Resolution", Sep. 17, 2016 (2016-09-17), SAT 2015 18TH International Conference, Austin, Tx, USA, Sep. 24-27, 2015; [Lecture Notes in Computer Science; Lect.Notes Computer], Springer, Berlin, Heidelberg, pp. 694-711.

\* cited by examiner (a)

Dark area

Bright area (b)

(a)

(b)

(a) (b) (c)

IMAGE PROCESSING METHOD AND RELATED DEVICE THEREOF

CROSS-REFERENCE TO RELATED APPLICATIONS

This application is a national stage of International Application No. PCT/CN2022/113424, filed on Aug. 18, 2022, which claims priority to Chinese Patent Application No. 202111677018.1, filed on Dec. 31, 2021. The disclosures of both of the aforementioned applications are hereby incorporated by reference in their entireties.

TECHNICAL FIELD

This application relates to the field of image processing, and in particular, to an image processing method and a related device thereof.

BACKGROUND

With wide application of electronic devices, taking photos with the electronic devices has become a daily behavior in people's lives. Using an example in which the electronic device is a mobile phone, multiple algorithms emerge accordingly to improve image quality.

However, in some scenes with dark light such as a night scene, due to low illumination in the scene, a signal is weak when the mobile phone captures an image, and color cast occurs on the generated image. This cannot be effectively resolved in the prior art. Therefore, how to correct a color of an image captured in the scene with low illumination has become a problem to be urgently resolved.

SUMMARY

This application provides an image processing method and a related device thereof, to correct a color of a dark area of an image captured in a scene with low illumination or a high-dynamic-range scene, and improve quality, thereby improving user experience.

To achieve the foregoing objective, the following technical solutions are used in this application:

According to a first aspect, an image processing method is provided. The method includes:

displaying a first interface, where the first interface includes a first control; detecting a first operation on the first control; obtaining a plurality of frames of exposure images in response to the first operation, where exposure time of the plurality of frames of exposure images is different, the plurality of frames of exposure images include at least one frame of first long-exposure image, and exposure time of the first long-exposure image is longer than that of a remaining exposure image in the plurality of frames of exposure images; and performing style transfer on the plurality of frames of exposure images to obtain a target image.

Embodiments of this application provide the image processing method, to perform style transfer on the plurality of frames of exposure images, so that a color of a dark area of an image captured in a scene with low illumination or a high-dynamic-range scene can be corrected, and quality can be improved, thereby improving user experience.

In a possible implementation of the first aspect, before the performing style transfer on the plurality of frames of exposure images to obtain a target image, the method further includes: processing the plurality of frames of exposure images by using a deep learning network model to obtain a first fused image; and performing first backend processing on the first fused image to obtain a first backend image.

Optionally, the deep learning network model can perform at least one of noise reduction and demosaicing, and can also perform processing such as multiexpo fusion.

In this implementation, the noise reduction, the demosaicing, and the multiexpo fusion are all implemented by one deep learning network model in the embodiments of this application. This avoids mutual impact caused between different processing when various processing is serially performed and brought error accumulation, thereby improving an image detail restoration effect.

In a possible implementation of the first aspect, the method further includes: performing second backend processing on the first long-exposure image to obtain a second backend image.

In this implementation, the first long-exposure image in the plurality of frames of exposure images is reused, so that the style transfer can be subsequently performed by using the second backend image corresponding to the first long-exposure image. In this case, a data amount is small.

In a possible implementation of the first aspect, the method further includes: obtaining a second long-exposure image, where exposure time of the second long-exposure image is longer than that of a remaining exposure image other than the first long-exposure image in the plurality of frames of exposure images; and performing second backend processing on the second long-exposure image to obtain a second backend image.

In this implementation, one frame of long-exposure image with long exposure time is additionally captured, so that the style transfer can be subsequently performed by using the second backend image corresponding to the additionally captured second long-exposure image.

In a possible implementation of the first aspect, the performing style transfer on the plurality of frames of exposure images to obtain a target image includes: performing style transfer on the first backend image and the second backend image by using a target style transfer network model to obtain the target image.

In this implementation, the first long-exposure image is reused to determine the corresponding second backend image according to the first long-exposure image, or the second long-exposure image is additionally captured to determine the corresponding second backend image according to the second long-exposure image. Then, a style corresponding to the second backend image is transferred to the first backend image by using the target style transfer network model, to correct a color a dark area of the target image.

In a possible implementation of the first aspect, the method further includes: determining whether an ambient luminance value corresponding to the first backend image is less than a preset ambient luminance value; and if no, outputting the first backend image as the target image; or if yes, performing style transfer on the first backend image and the second backend image by using the target style transfer network model to obtain the target image.

In this implementation, the ambient luminance value corresponding to the first backend image is determined, so that an image with slight color cast can be sifted out, and is not subjected to the style transfer, to reduce a calculation amount and improve processing efficiency.

In a possible implementation of the first aspect, the performing processing on the first backend image and the second backend image by using a target style transfer network model to obtain the target image includes: processing the first backend image and the second backend image by using the target style transfer network model to obtain a first style transformation matrix; up-sampling the first style transformation matrix to obtain a second style transformation matrix; determining a mask image corresponding to the second backend image; and fusing the first backend image, the second style transformation matrix, and the mask image to obtain the target image.

The first style transformation matrix represents a chrominance deviation amount between two frames of images that are input into the target style transfer network model, and represents a chrominance deviation amount between the first backend image and the second backend image herein.

In this implementation, the chrominance deviation amount can be determined by using the target style transfer network model. Therefore, the chrominance deviation amount between the first backend image and the second backend image can be determined by using the target style transfer network model, and then the style transfer is directly performed on the first backend image in combination with the mask image.

In a possible implementation of the first aspect, the processing the first backend image and the second backend image by using the target style transfer network model to obtain a first style transformation matrix includes: processing the first backend image and the second backend image by using the target style transfer network model to obtain a chrominance deviation coefficient; and determining the first style transformation matrix according to the first backend image and the chrominance deviation coefficient.

The chrominance deviation coefficient represents a chrominance deviation magnitude between two frames of images that are input into the target style transfer network model, and represents a chrominance deviation magnitude between the first backend image and the second backend image herein. There is a function mapping relationship between the chrominance deviation coefficient, the luminance value of the first backend image, and the chrominance deviation amount.

In this implementation, the chrominance deviation coefficient can be determined by using the target style transfer network model. Therefore, the chrominance deviation coefficient between the first backend image and the second backend image can be determined by using the target style transfer network model, and the first style transformation matrix is indirectly determined in combination with the first backend image and the chrominance deviation coefficient. Then, the style transfer is performed on the first backend image in combination with the mask image.

In a possible implementation of the first aspect, the method further includes: separately converting the first backend image and the second backend image from a YUV domain to an RGB domain; and the processing the first backend image and the second backend image by using the target style transfer network model includes: processing, by using the target style transfer network model, the first backend image and the second backend image that have been converted from the YUV domain to the RGB domain.

In this implementation, if the target style transfer network model is generated through training based on a training image in the RGB domain, the input first backend image and second backend image need to be converted into the RGB domain during processing.

In a possible implementation of the first aspect, the method further includes: training an initial style transfer network model by using a plurality of pairs of training images to determine the target style transfer network model, where the plurality of pairs of training images are all in the RGB domain, and each pair of training images has same content but different colors corresponding to dark areas.

In this implementation, the initial style network model is trained by using the training images in the RGB domain. Therefore, the target style transfer network model obtained through training can be used to determine a first style transformation matrix or a chrominance deviation coefficient between images in the RGB domain.

In a possible implementation of the first aspect, the method further includes: training an initial style transfer network model by using a plurality of pairs of training images to determine the target style transfer network model, where the plurality of pairs of training images are all in a YUV domain, and each pair of training images has same content but different colors corresponding to dark areas.

In this implementation, the initial style network model is trained by using the training images in the YUV domain. Therefore, the target style transfer network model obtained through training can be used to determine a first style transformation matrix or a chrominance deviation coefficient between images in the YUV domain.

In a possible implementation of the first aspect, the training an initial style transfer network model by using a plurality of pairs of training images to determine the target style transfer network model includes: processing each frame of training image in each pair of training images by using one feature network model to obtain a corresponding feature map; and training the initial style transfer network model by using two feature maps corresponding to each pair of training images, to obtain the target style transfer network model.

In this implementation, feature extraction may be separately performed on two frames of training images in each pair of training images.

In a possible implementation of the first aspect, the training an initial style transfer network model by using a plurality of pairs of training images to determine the target style transfer network model includes: splicing two frames of training images included in each pair of training images to obtain a spliced training image; processing the spliced training image by using a feature network model to obtain a corresponding spliced feature map; and training the initial style transfer network model by using the spliced feature map to obtain the target style transfer network model.

In this implementation, the two frames of training images in each pair of training images may be spliced into a combination for feature extraction.

In a possible implementation of the first aspect, the feature extraction network model is any one of a ResNet model, a VGG model, and a MobileNet model.

In a possible implementation of the first aspect, the deep learning network model is any one of a Unet model, an LLnet model, and an FCN model.

In a possible implementation of the first aspect, the first backend processing includes: conversion from an RGB domain to a YUV domain.

In a possible implementation of the first aspect, the first backend processing further includes: at least one of dynamic range control and tone mapping.

In a possible implementation of the first aspect, the second backend processing includes: conversion from a RAW domain to a YUV domain.

In a possible implementation of the first aspect, the target style transfer network model is any one of a ResNet model, a VGG model, a Unet model, and a Vnet model.

According to a second aspect, an image processing apparatus is provided. The apparatus includes a unit configured to perform each step in any one of the first aspect or the possible implementation of the first aspect.

According to a third aspect, an electronic device is provided, including: one or more processors and a memory, where the memory is coupled to the one or more processors, and is configured to store computer program code; the computer program code includes computer instructions; and the one or more processors invoke the computer instructions to cause the electronic device to perform the step processed in the image processing method provided in any one of the first aspect or the possible implementation of the first aspect.

According to a fourth aspect, a chip is provided, including: a processor, configured to invoke a computer program from a memory and run the computer program, to cause a device installed with the chip to perform the step processed in the image processing method provided in any one of the first aspect or the possible implementation of the first aspect.

According to a fifth aspect, a computer-readable storage medium is provided. The computer-readable storage medium stores a computer program, and the computer program includes program instructions. When the program instructions are executed by a processor, the processor is caused to perform the step processed in the image processing method provided in any one of the first aspect or the possible implementation of the first aspect.

According to a sixth aspect, a computer program product is provided. The computer program product includes a computer-readable storage medium that stores a computer program. The computer program causes a computer to perform the step processed in the image processing method provided in any one of the first aspect or the possible implementation of the first aspect.

For beneficial effects of the second aspect to the sixth aspect, refer to the beneficial effects of the first aspect, and details are not described herein again.

DETAILED DESCRIPTION OF ILLUSTRATIVE EMBODIMENTS

Figure 1:
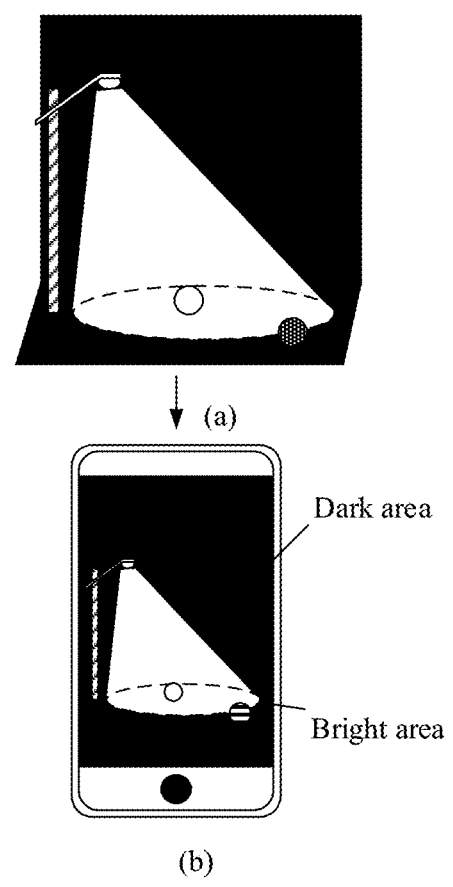
FIG. 1 shows an application scenario according to an embodiment of this application.

The following describes technical solutions of this application with reference to the accompanying drawings.

In descriptions of embodiments of this application, "/" means "or" unless otherwise specified. For example, A/B may represent A or B. In this specification, "and/or" describes only an association relationship between associated objects and indicates that three relationships may exist. For example, A and/or B may represent the following three cases: Only A exists, both A and B exist, and only B exists. In addition, in the descriptions of the embodiments of this application, "a plurality of" represents two or more.

The terms "first" and "second" below are used merely for the purpose of description, and shall not be construed as indicating or implying relative importance or implying a quantity of indicated technical features. Therefore, a feature limited by "first" or "second" may explicitly or implicitly include one or more of the features. In the descriptions of the embodiments, unless otherwise stated, "a plurality of" means two or more.

Some terms in the embodiments of this application are first described for ease of understanding by a person skilled in the art.

1. RGB (red, green, blue) color space or RGB domain: refers to a color model related to a structure of a human visual system. According to a structure of human eyes, all colors are considered as different combinations of red, green, and blue.

2. YUV color space: refers to a color coding method, where Y represents luminance (luminance or luma), and U and V represent chrominance (chrominance or chroma). The RGB color space focuses on sensitivity of the human eyes to colors, while the YUV color space focuses on sensitivity of vision to the luminance. The RGB color space and the YUV color space may be converted to each other.

3. Pixel value: refers to a set of color components corresponding to each pixel in a color image in the RGB color space. For example, each pixel corresponds to one set of three-primary-color components, where the three-primary-color components are respectively a red component R, a green component G, and a blue component B.

4. Bayer image (bayer image): is an image that is output by an image sensor that is based on a Bayer color filter array. Pixels of various colors in the image are arranged in a Bayer format. Each pixel in the Bayer image corresponds to a channel signal of only one color. For example, because human vision is sensitive to green, a green pixel (a pixel corresponding to a green channel signal) may be set to account for 50% of all pixels, and a blue pixel (a pixel corresponding to a blue channel signal) and a red pixel (a pixel corresponding to a red channel signal) each may be set to account for 25% of all the pixels. A minimal repeating unit of the Bayer image is: one red pixel, two green pixels, and one blue pixel that are arranged in a 2×2 form. An image arranged in the Bayer format may be considered as being in a RAW domain.

5. Shooting parameter: may include a shutter, exposure time, an aperture value (aperture value, AV), an exposure value (exposure value, EV), and photosensibility, namely, ISO. Descriptions are separately provided below.

The shutter is an apparatus that controls time of light entering a camera to determine exposure time of an image. Longer time for which the shutter is on indicates more light that enters the camera and longer exposure time corresponding to the image. On the contrary, shorter time for which the shutter is on indicates less light that enters the camera and shorter exposure time corresponding to the image.

The exposure time refers to time for which the shutter needs to be on to project the light onto a photosensitive surface of a photosensitive material of the camera. The exposure time is determined based on photosensibility of the photosensitive material and illumination on the photosensitive surface. Longer exposure time indicates more light that enters the camera, and shorter exposure time indicates less light that enters the camera. Therefore, longer exposure time is needed in a dark scene, and shorter exposure time is needed in a backlight scene.

The aperture value is a ratio of a focal length of a lens (lens) in the camera to a light passing diameter of the lens. A larger aperture value indicates more light that enters the camera. A smaller aperture value indicates less light that enters the camera.

The exposure value is a value that is obtained by combining the exposure time and the aperture value and that represents a light passing capability of the lens of the camera. The exposure value may be defined as:

$$EV = \log_g \frac{N^2}{t}$$

N is the aperture value. t is the exposure time in seconds.

The ISO is used to measure sensitivity of a negative film to light, namely, photosensibility or a gain. An insensitive negative film needs longer exposure time to achieve an image with same luminance as a sensitive negative film. A sensitive negative film needs shorter exposure time to achieve an image with same luminance as an insensitive negative film.

For the shutter, the exposure time, the aperture value, the exposure value, and the ISO among the shooting parameters, an electronic device can implement at least one of auto focus (auto focus, AF), automatic exposure (automatic exposure, AE), and auto white balance (auto white balance, AWB) through an algorithm, to achieve automatic adjustment of these shooting parameters.

The terms in the embodiments of this application are briefly described above, and details are not described below again.

With wide application of electronic devices, taking photos with the electronic devices has become a daily behavior in people's lives. Using an example in which the electronic device is a mobile phone, multiple algorithms emerge accordingly to improve image quality.

However, in some night scenes with dark light or high dynamic range (high dynamic range, HDR) scenes, a problem of color cast in a dark area of a captured image cannot be effectively resolved in the prior art.

For example, FIG. 1 shows an application scenario to which the embodiments of this application are applicable.

As shown in (a) in FIG. 1, illumination in areas in this scene is low except for an area caught by a street lamp. When a mobile phone shoots the scene, the area caught by the street lamp may be correspondingly referred to as a bright area, and the other areas are correspondingly referred to as dark areas. As shown in (b) in FIG. 1, because the illumination in the dark area in the scene is lower than that in the bright area, when the mobile phone captures an image, a signal corresponding to the dark area is weaker than that corresponding to the bright area, and color cast in a dark area in the generated image is also greater than that in a bright area. In this case, if there is also other interference, a degree of interference in the dark area is more serious than that in the bright area. Therefore, the color cast in the dark area is greater in combination with impact of the interference.

With reference to FIG. 1, if a purple ball is placed in each of the bright and dark areas, when the mobile phone captures an image, a signal corresponding to the bright area is strong and has a normal color, in other words, the ball in the bright area in the captured image is still purple; while a signal corresponding to the dark area is weak and has color cast. For example, the ball that is originally purple is blue-purple in the image, and is in a blue tone.

Therefore, how to correct a color of an image captured in a scene with low illumination or in a scene partially with low illumination has become a problem to be urgently resolved.

In view of this, the embodiments of this application provide an image processing method. Based on a first fused image determined through a relevant image processing method and in combination with one frame of long-exposure image with long exposure time, a style corresponding to the long-exposure image is transferred to the first fused image during secondary fusion, to correct a color of a dark area of the first fused image, thereby obtaining a target image whose color is closer to a color of a real scene.

It should be understood that the scenario shown in FIG. 1 is an example of the application scenario, and constitutes no limitation on the application scenario of this application. The image processing method provided in the embodiments of this application may be applied to but is not limited to the following scenarios:

image capturing, video recording, a video call, a video conferencing application, long and short video applications, a live video application, a video online course application, an intelligent camera movement application scenario, video recording using a system camera video function, video surveillance, a smart peephole, and other shooting scenarios.

The following describes the image processing method in the embodiments of this application in detail with reference to the accompanying drawings.

Figure 2:
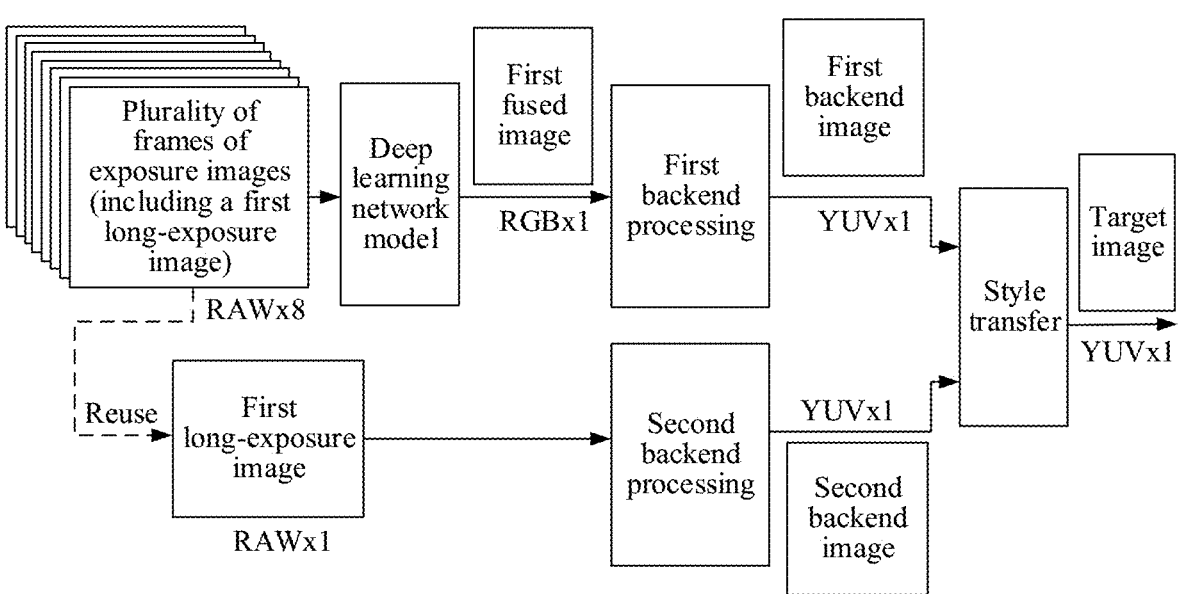
FIG. 2 is a schematic flowchart of an image processing method according to an embodiment of this application.

FIG. 2 is a flowchart of an image processing method according to an embodiment of this application. The method is applied to an electronic device.

As shown in FIG. 2, the image processing method provided in this embodiment of this application may include S110 to S150. These steps are described below in detail.

S110: Obtain a plurality of frames of exposure images.

The plurality of frames of exposure images have different exposure time, and include at least one frame of first long-exposure image. Exposure time of the first long-exposure image is longer than that of a remaining exposure image in the plurality of frames of exposure images.

It should be understood, that the plurality of frames of exposure images have different exposure time means: At least two frames of exposure images in the plurality of frames of exposure images correspond to different exposure time, or all the plurality of frames of exposure images correspond to different exposure time.

An exposure image with long exposure time may be referred to as a long-exposure image, an exposure image with short exposure time may be referred to as a short-exposure image, and an image whose exposure time is between the time corresponding to the long-exposure image and the time corresponding to the short-exposure image may be referred to as a normal-exposure image. It can be understood that the concepts of "long exposure", "short exposure", and "normal exposure" herein are relative, and lengths of the exposure time respectively corresponding to the long-exposure image, the normal-exposure image, and the short-exposure image may be classified and modified as required. This is not limited in this embodiment of this application. The long-exposure image includes the foregoing first long-exposure image.

When the plurality of frames of exposure images include a plurality of frames of first long-exposure images, the plurality of frames of first long-exposure images may correspond to same or different exposure time. This is not limited in this embodiment of this application.

In some embodiments, the electronic device may include one or more image sensors. In this case, the electronic device may control the one or more image sensors to shoot, to obtain the plurality of frames of exposure images. In some other embodiments, regardless of whether the electronic device includes an image sensor, the electronic device may locally store the plurality of frames of exposure images or obtain the plurality of frames of exposure images from another device. For example, a user may capture the plurality of frames of exposure images by using a first electronic device D1, and then send the plurality of frames of exposure images to a second electronic device D2. After receiving the plurality of frames of exposure images, the second electronic device D2 may perform the image processing method provided in this embodiment of this application for image processing. Certainly, in an actual application process, the electronic device may alternatively obtain the plurality of frames of exposure images in another manner. This is not limited in this embodiment of this application.

It should be understood that the plurality of frames of exposure images may be exposure images directly generated by the image sensor, or may be images obtained by performing one or more processing operations on the exposure images.

It should be understood that the plurality of frames of exposure images include two or more frames of exposure images. The plurality of frames of exposure images are all Bayer images, namely, images in a RAW domain.

It should be understood that the plurality of frames of exposure images may be images obtained by continuously shooting a same scene to be shot, where an interval between two adjacent frames of exposure images obtained through exposure may be ignored relative to exposure time of any frame of exposure image.

It should be understood that each exposure image in the plurality of frames of exposure images corresponds to one start exposure moment and one end exposure moment, and duration from the start exposure moment to the end exposure moment is exposure time corresponding to the exposure image. All the start exposure moment, the end exposure moment, and the exposure time corresponding to the exposure image may be carried in the exposure image or stored in correspondence to the exposure image.

An exposure manner of the plurality of frames of exposure images is not limited in this embodiment of this application. For example, the exposure time corresponding to the plurality of frames of exposure images sequentially increases in an exposure order. Alternatively, for example, the exposure time corresponding to the plurality of frames of exposure images sequentially decreases in an exposure order. A time interval between any two times of exposure is ignored.

Figure 3:
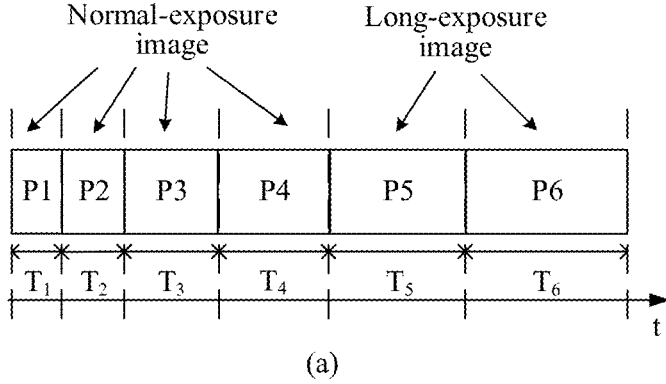
FIG. 3 shows two exposure manners according to an embodiment of this application.
Figure 3:
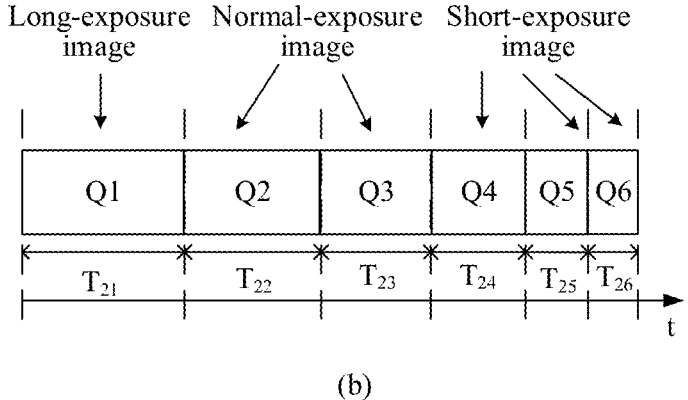

For example, FIG. 3 shows two exposure manners according to an embodiment of this application. As shown in (a) in FIG. 3, the electronic device performs exposure continuously for six times, to obtain six frames of exposure images, namely, an exposure image P1 to an exposure image P6. Exposure time corresponding to the exposure image P1 is T1, and exposure time corresponding to the exposure image P2 is T2, where T2>T1. Exposure time corresponding to the exposure image P3 is T3, where T3>T2. By analogy, exposure time corresponding to the exposure image P5 is T5, and exposure time corresponding to the exposure image P6 is T6, where T6>T5.

The first frame of exposure image P1 to the fourth frame of exposure image may be referred to as normal-exposure images. The exposure time of the fifth frame of exposure image and the sixth frame of exposure image is longer than that of the normal-exposure image. Therefore, the fifth frame of exposure image and the sixth frame of exposure image may be referred to as long-exposure images.

As shown in (b) in FIG. 3, the electronic device performs exposure continuously for six times, to obtain six frames of exposure images, namely, an exposure image Q1 to an exposure image Q6. Exposure time corresponding to the exposure image Q1 is T21, and exposure time corresponding to the exposure image Q2 is T22, where T21>T22. Exposure time corresponding to the exposure image Q3 is T23, where T22>T23. By analogy, exposure time corresponding to the exposure image Q5 is T25, and exposure time corresponding to the exposure image Q6 is T26, where T25>T26.

The second frame of exposure image Q2 and the third frame of exposure image may be referred to as normal-exposure images. The exposure time of the first frame of exposure image is longer than that of the normal-exposure image. Therefore, the first frame of exposure image may be referred to as a long-exposure image. Exposure time of the fourth frame of exposure image to the sixth frame of exposure image is shorter than that of the normal-exposure image. Therefore, the fourth frame of exposure image to the sixth frame of exposure image may be referred to as short-exposure images.

S120: Process the plurality of frames of exposure images by using a deep learning network model, to obtain a first fused image corresponding to the plurality of frames of exposure images.

The first fused image is in RGB color space, namely, in an RGB domain.

It should be understood that each pixel in the first fused image in the RGB domain includes three color components, to be specific, each pixel includes a red component, a green component, and a blue component. A size of the first fused image may be the same as that of any one of the plurality of frames of exposure images.

Optionally, the deep learning network model can perform at least one of noise reduction and demosaicing, and can also perform processing such as multiexpo fusion (mutiexpo fusion).

It should be understood that when the image sensor is used to obtain the plurality of frames of exposure images, illumination in an external environment is low, and performance of the image sensor brings much noise to the generated plurality of frames of exposure images, where the noise blurs the whole exposure image and causes many details to get lost. Therefore, it is necessary to perform noise reduction to reduce impact of the noise.

It should be understood that because the demosaicing and the noise reduction are both operations related to detail restoration, first performing demosaicing affects a noise reduction effect, and first performing noise reduction affects a demosaicing effect, in this embodiment of this application, both the noise reduction and the demosaicing are achieved through one deep learning network model, to avoid mutual impact caused between different processing when various processing is serially performed and brought error accumulation, thereby improving an image detail restoration effect.

It should be understood that the multiexpo fusion means fusing a plurality of frames of images with different exposure time.

Optionally, the deep learning network model may be any one of a Unet model, an LLnet model, and an FCN model.

Certainly, the deep learning network model may alternatively be another model. A specific model may be selected as required, and this is not limited in this embodiment of this application.

S130: Perform first backend processing on the first fused image to obtain a first backend image corresponding to the first fused image.

Optionally, the first backend processing includes conversion from the RGB domain to a YUV domain.

When the first fused image is converted from the RGB domain to the YUV domain, it means that the first fused image in the RGB domain is converted to an image in the YUV domain, in other words, in this case, the first backend image is in the YUV domain.

It should be understood that a data amount of the first backend image in the YUV domain is small, and can better reflect luminance, color, and saturation information of a scene.

Optionally, the first backend processing may further include at least one of dynamic range control (dynamic range control, DRC) and tone mapping (tone mapping).

It should be understood that the dynamic range control is used to provide compression and amplification capabilities. For example, a dynamic range of a current image can be mapped to a larger dynamic range, so that a pixel in a bright area in the image corresponds to larger luminance, and a pixel in a dark area corresponds to smaller luminance.

The tone mapping means performing mapping transformation on a color of an image. For example, a gray level of the image can be adjusted through the tone mapping, so that a processed image is more comfortable for human eyes, and the image obtained through the tone mapping can better express information and a feature in the original image.

After the plurality of frames of exposure images are processed by using the deep learning network model, although the obtained first fused image is an image in the RGB domain (namely, an RGB image), a color corresponding to the first fused image only meets a display requirement of the electronic device, and does not meet a viewing requirement of human vision. It may be considered that the first fused image is a linear RGB image. Therefore, it is necessary to further perform processing such as the dynamic range control and the tone mapping on the first fused image, to process the first fused image into a nonlinear RGB image that is more suitable for the human eyes to view.

Figure 4:
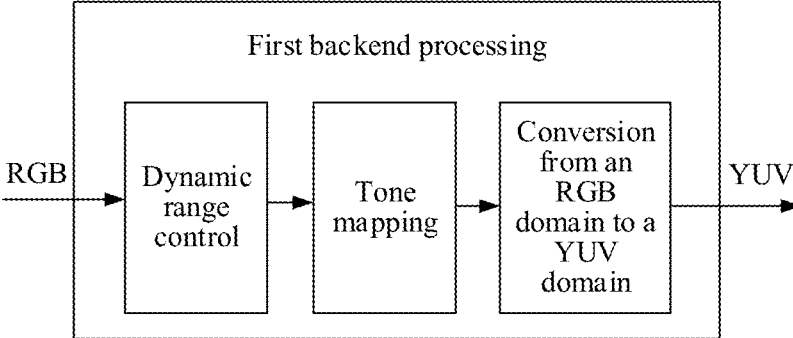
FIG. 4 is a schematic flowchart of first backend processing according to an embodiment of this application.

FIG. 4 is a schematic flowchart of the first backend processing according to this embodiment of this application.

As shown in FIG. 4, the first backend processing sequentially includes the dynamic range control, the tone mapping, and the conversion from the RGB domain to the YUV domain.

Certainly, the foregoing is merely an example of the first backend processing. The first backend processing may further include another step, and a sequence of a plurality of steps included in the first backend processing may be modified as required. This is not limited in this embodiment of this application.

S140: Perform second backend processing on the first long-exposure image to obtain a second backend image.

The performing second backend processing on the first long-exposure image is to reuse the first long-exposure image in the plurality of obtained frames of exposure images without additional obtaining, so that an amount of collected data can be reduced. The second backend processing may be performed on one or more frames of first long-exposure images in the plurality of frames of exposure images to obtain the second backend image.

It should be understood that the first long-exposure image is in the RAW domain, and the second backend image is in the YUV domain.

Figure 5:
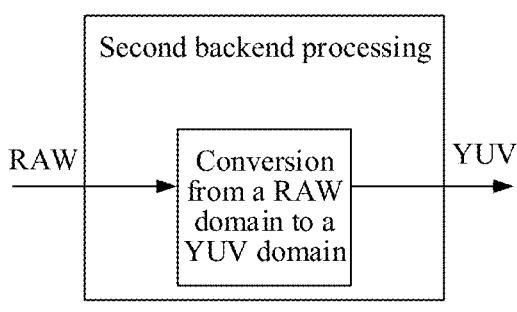
FIG. 5 is a schematic flowchart of second backend processing according to an embodiment of this application.

Optionally, as shown in FIG. 5, the second backend processing includes conversion from the RAW domain to the YUV domain.

Certainly, the foregoing is merely an example of the second backend processing. The second backend processing may further include another step, and a sequence of a plurality of steps included in the second backend processing may be modified as required. This is not limited in this embodiment of this application.

S150: Perform style transfer on the first backend image and the second backend image by using a target style transfer network model to obtain a target image.

It should be understood that the style transfer means correcting a color of the first backend image by using color cast between the first backend image and the second backend image, thereby improving quality of the target image.

It should be understood that the first backend image is obtained by performing a series of processing such as the noise reduction on the plurality of frames of exposure images, corresponding noise is already very small, and definition is very high, but there is still a problem of color cast in a dark area that causes a large difference from a real scene. The second backend image is obtained by performing second backend processing on the first long-exposure image. Because of long exposure time, a color of the first long-exposure image more conforms to the real scene, and correspondingly, a color of the second backend image also more conforms to the real scene. Therefore, to resolve the problem of color cast in the dark area on the basis of the first backend image, the color of the first long-exposure image may be transferred to the first backend image, while features of low noise and high definition of the first backend image are retained. In this way, the target image with high quality can be obtained by performing style transfer on the first backend image and the second backend image by using the target style transfer network model.

Optionally, the style transfer network model further needs to be obtained through training before the style transfer is performed by using the target style transfer network model. Therefore, the foregoing method may further include S160.

S160: Train an initial style transfer network model by using a plurality of pairs of training images to determine the target style transfer network model.

The initial style transfer network model may be any one of a ResNet model, a VGG model, a Unet model, and a Vnet model. Correspondingly, the determined target style transfer network model and the initial style transfer network model correspond to a same original model.

Figure 6:
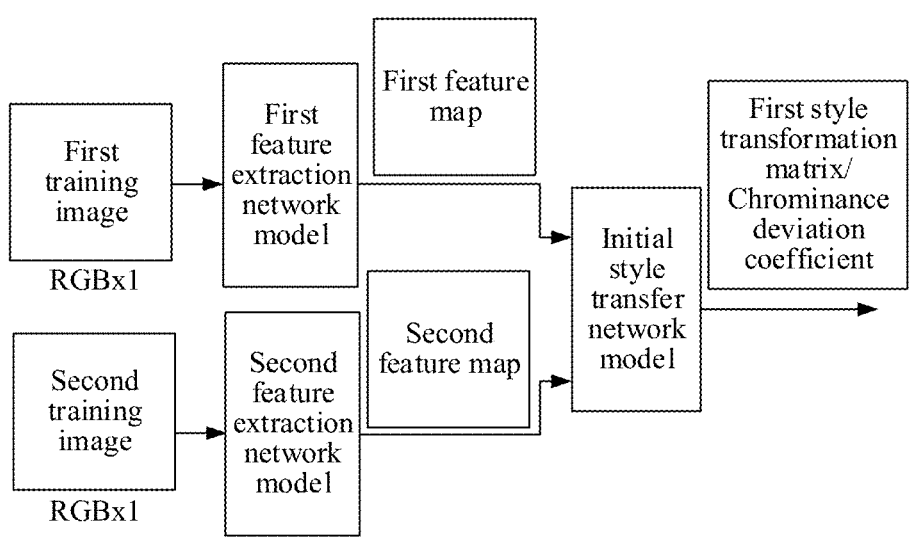
FIG. 6 is a schematic flowchart of training a target style transfer network model according to an embodiment of this application.

Optionally, in a first implementation, as shown in FIG. 6, the initial style transfer network model may be trained by using a plurality of pairs of training images in the RGB domain to determine the target style transfer network model.

For example, each pair of training images includes a first training image and a second training image that are both in the RGB domain. The first training image and the second training image are images obtained by shooting a same scene to be shot, in other words, the first training image and the second training image include same content.

However, dark areas in the first training image and the second training image correspond to different colors. The dark area refers to an area that is in the first training image and the second training image and whose luminance value is less than a preset luminance value. For example, there is color cast in the dark area of the first training image, and a color of the dark area in the second training image is normal.

During training, the first training image in each pair of training images is first input into a first feature extraction network model, to determine a first feature map (feature map) corresponding to the first training image. The second training image is input into a second feature extraction network model, to determine a second feature map corresponding to the second training image.

Then, the first feature map and the second feature map are input into the initial style transfer network model, to determine a corresponding first style transformation matrix or chrominance deviation coefficient between the first training image and the second training image.

After the first style transformation matrix or the chrominance deviation coefficient is obtained, the first style transformation matrix or the chrominance deviation coefficient may be used for the first training image, to determine whether a color of a corresponding image obtained by performing style transfer on the first training image based on the first style transformation matrix or the chrominance deviation coefficient is consistent or close to a color of the second training image, or to determine whether a difference between pixel values of the corresponding image and the second training image is less than a preset difference threshold (for example, 0.008). If it is determined that the colors of the two frames of images are close, or the difference between the two frames of images is less than the preset difference threshold, it may be considered that the initial style transfer network model has been trained, and the trained initial style transfer network model is used as the target style transfer network model.

If the foregoing condition is not met, a back propagation algorithm may be used to adjust a relevant parameter in the initial style transfer network model, and the initial style transfer network model is trained by using another training image until the target style transfer network model that conforms to a requirement is obtained.

It should be understood that the feature map represents an abstract feature extracted from an image, and the abstract feature may be, for example, a shade of a color.

It should be understood that the first style transformation matrix represents a chrominance deviation amount between two frames of input images. The first style transformation matrix includes a plurality of chrominance deviation amounts arranged in a plurality of rows and columns, and each chrominance deviation amount is correspondingly a difference between chrominance at a same position in the two frames of input images. The chrominance deviation coefficient represents a chrominance deviation magnitude between two frames of input images, where a larger chrominance deviation coefficient indicates greater chrominance deviation, and a smaller chrominance deviation coefficient indicates smaller chrominance deviation.

Optionally, both the first feature extraction network model and the second feature extraction network model may be any one of a ResNet model, a VGG model, and a MobileNet model.

The first feature extraction network model and the second feature extraction network model may be the same or different. This is not limited in this embodiment of this application.

It should be understood that because the training image in the RGB domain is input during training, the target style transfer network model obtained through training can be used to determine a first style transformation matrix or a chrominance deviation coefficient between images in the RGB domain.

It should also be understood that to enhance a processing ability of a trained template style transfer network model, in addition to different colors of the dark areas, there may be other differences between the first training image and the second training image, for example, a difference between colors of bright areas. The training image may be specifically captured as required. This is not limited in this embodiment of this application.

Optionally, in a second implementation, the initial style transfer network model may be trained by using the plurality of pairs of training images in the YUV domain to determine the target style transfer network model.

A process of training the initial style transfer network model by using the plurality of pairs of training images in the YUV domain is similar to the process corresponding to the first embodiment, and reference may be made to the foregoing descriptions. Details are not described herein again.

It should be understood that because the training image in the YUV domain is input during training, the target style transfer network model obtained through training can be used to determine a first style transformation matrix or a chrominance deviation coefficient between images in the YUV domain.

Figure 7:
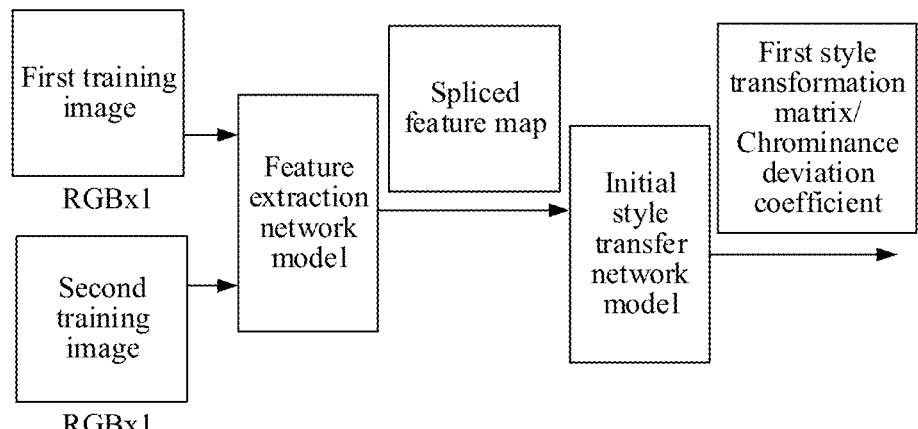
FIG. 7 is another schematic flowchart of training a target style transfer network model according to an embodiment of this application.

Optionally, in a third implementation, as shown in FIG. 7, the initial style transfer network model may be trained by using a plurality of pairs of training images in the RGB domain to determine the target style transfer network model.

During training, a first training image and a second training image in each pair of training images are first spliced to obtain a spliced training image. Then, the spliced training image is processed by using a feature network model to obtain a corresponding spliced feature map. Next, the spliced feature map is processed by using the initial style transfer network model to obtain a corresponding first style transformation matrix or chrominance deviation coefficient.

Optionally, in a fourth implementation, the initial style transfer network model may be trained by using a plurality of pairs of training images in the YUV domain to determine the target style transfer network model.

A training process thereof is similar to the process corresponding to the third embodiment, and reference may be made to the foregoing descriptions. Details are not described herein again.

In this embodiment of this application, the plurality of frames of exposure images are processed by using the deep learning network model to obtain the first fused image, and then the first backend processing is performed on the first fused image to obtain the first backend image. Then, one frame of long-exposure image with long exposure time and closer to the color of the real scene is reused to perform second backend processing on the long-exposure image, to obtain the second backend image. Based on this, secondary fusion is performed on the first backend image and the second backend image corresponding to the long-exposure image by using the target style transfer network model. In addition, a style of the second backend image corresponding to the long-exposure image is transferred to the first backend image during the secondary fusion, and the color of the dark area of the first backend image is corrected, to obtain the target image close to the color of the real scene.

Figure 8:
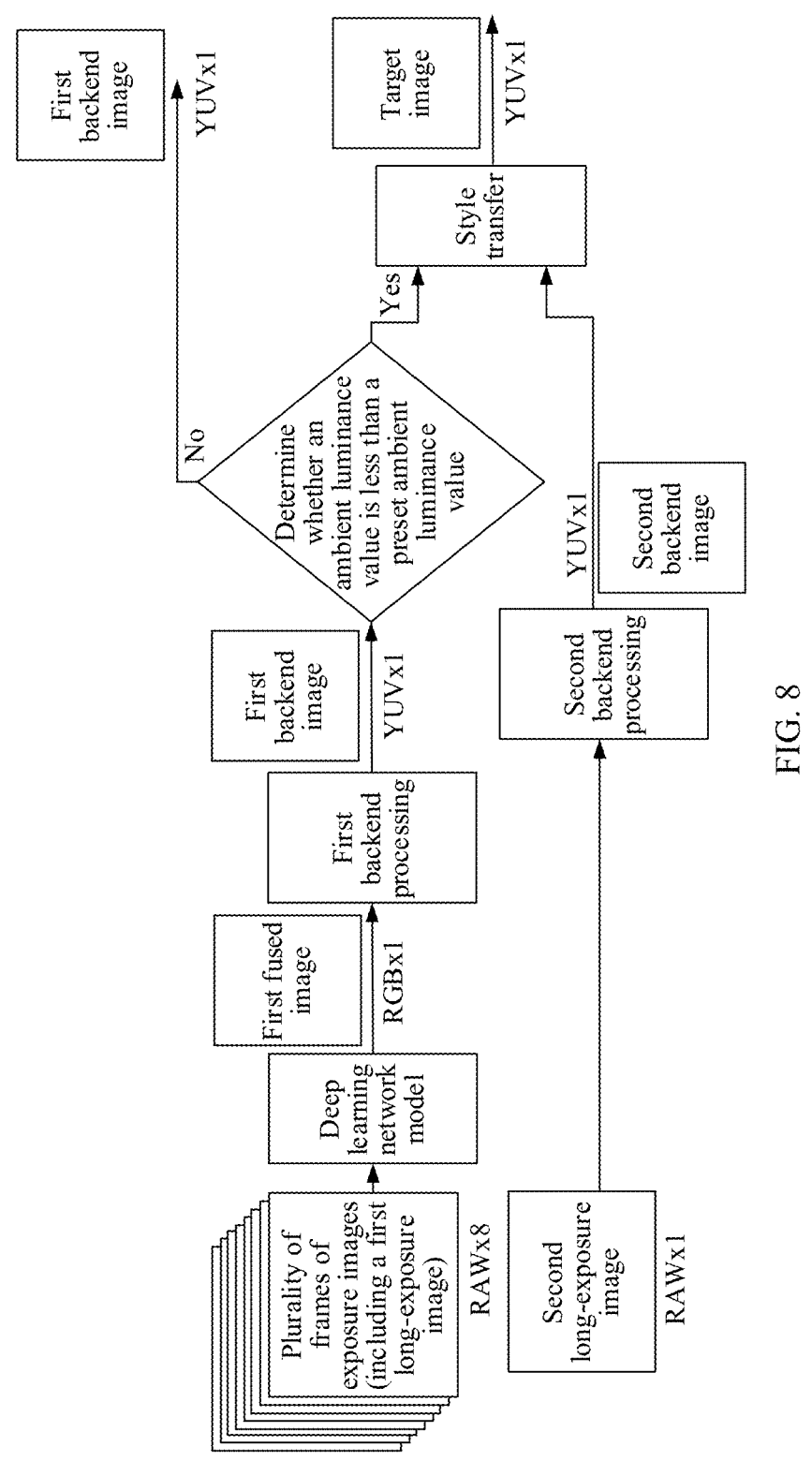
FIG. 8 is another schematic flowchart of an image processing method according to an embodiment of this application.

FIG. 8 is another schematic flowchart of an image processing method according to an embodiment of this application. The method is applied to an electronic device.

As shown in FIG. 8, the image processing method provided in this embodiment of this application may include S210 to S260. These steps are described in detail below.

S210: Obtain a plurality of frames of exposure images.

The plurality of frames of exposure images have different exposure time, and include at least one frame of first long-exposure image. Exposure time of the first long-exposure image is longer than that of a remaining exposure image in the plurality of frames of exposure images.

S220: Process the plurality of frames of exposure images by using a deep learning network model, to obtain a first fused image corresponding to the plurality of frames of exposure images.

S230: Perform first backend processing on the first fused image to obtain a first backend image corresponding to the first fused image.

Processes of S210 to S230 are the same as those of S110 to S130, and reference may be made to the foregoing descriptions. Details are not described herein again.

S240: Obtain a second long-exposure image.

Exposure time of the second long-exposure image is longer than that of an exposure image other than the first long-exposure image in the plurality of frames of exposure images.

It should be understood that the exposure time of the second long-exposure image may be greater than or equal to that of the first long-exposure image.

It should be understood that one or more frames of second long-exposure images may be obtained herein. When a plurality of frames of second long-exposure images are obtained, exposure time of the plurality of frames of second long-exposure images may be the same or different.

In some embodiments, the electronic device may include one or more image sensors. In this case, the electronic device may control the one or more image sensors to shoot, to obtain the plurality of frames of exposure images and the second long-exposure image. In some other embodiments, regardless of whether the electronic device includes an image sensor, the electronic device may locally store the plurality of frames of exposure images and the second long-exposure image or obtain the plurality of frames of exposure images and the second long-exposure image from another device. Alternatively, in another embodiment, the electronic device may control the one or more image sensors to shoot, to obtain the plurality of frames of exposure images, and locally store the second long-exposure image or obtain the second long-exposure image from another device. Certainly, in an actual application process, the electronic device may alternatively obtain the second long-exposure image in another manner. This is not limited in this embodiment of this application.

It should be understood that the second long-exposure image may be an exposure image directly generated by the image sensor, or may be an image obtained by performing one or more processing operations on the exposure image.

It should be understood that the second long-exposure image is a Bayer image, namely, an image in a RAW domain.

It should be understood that the second long-exposure image and the plurality of frames of exposure images are images obtained by continuously shooting a same scene to be shot, where a sequence of capturing the second long-exposure image and the plurality of frames of exposure images may be based on a requirement. This is not limited in this embodiment of this application.

S250: Perform second backend processing on the second long-exposure image to obtain a second backend image.

Descriptions of the second backend processing are the same as those in S140. Details are not described herein again.

S260: Perform style transfer on the first backend image and the second backend image by using a target style transfer network model to obtain a target image.

Optionally, as shown in FIG. 8, before S260, the method may further include S251 to S253.

S251: Determine whether an ambient luminance value (lux) corresponding to the first backend image is less than a preset ambient luminance value.

S252: If no, skip processing, and output the first backend image as the target image.

S253: If yes, perform style transfer on the first backend image and the second backend image by using the target transfer network model to obtain the target image.

When a light sensor is used to perceive and obtain the first backend image, an ambient luminance value corresponding to a surrounding environment may be stored. For example, if the light sensor determines that the ambient luminance value corresponding to the surrounding environment is 120 when the first backend image is obtained, where 120 is greater than the preset ambient luminance value, namely, 100, it can be determined that the surrounding environment has good illumination, and a color of the obtained first backend image can be guaranteed without large color cast. Therefore, there is no need for style transfer, and the first backend image is directly output as the target image.

If the light sensor determines that the ambient luminance value corresponding to the surrounding environment is 60 when the first backend image is obtained, where 60 is far less than the preset ambient luminance value, namely, 100, it can be determined that the surrounding environment has very poor illumination, a color of the obtained first backend image cannot be guaranteed, and large color cast occurs in a dark area. In this case, to resolve the problem of color cast in the dark area, it is necessary to use the target style transfer network model to perform style transfer on the first backend image and the second backend image, to obtain the target image that is close to a color of a real scene and that has no color cast in a dark area.

Herein, the ambient luminance value corresponding to the first backend image is determined, so that an image with slight color cast can be sifted out, and is not subjected to the style transfer, to reduce a calculation amount and improve processing efficiency.

In this embodiment of this application, the plurality of frames of exposure images are processed by using the deep learning network model to obtain the first fused image, and then the first backend processing is performed on the first fused image to obtain the first backend image. Then, one frame of long-exposure image with long exposure time and closer to the color of the real scene is further captured to perform second backend processing on the long-exposure image, to obtain the second backend image. Based on this, secondary fusion is performed on the first backend image and the second backend image corresponding to the long-exposure image by using the target style transfer network model. In addition, a style of the second backend image corresponding to the long-exposure image is transferred to the first backend image during the secondary fusion, and the color of the dark area of the first backend image is corrected, to obtain the target image close to the color of the real scene.

On this basis, the ambient luminance value of the first backend image may be further filtered. When the first backend image meets a requirement, it indicates that the color cast of the image is not serious, and the first backend image can be output directly without processing. Only a first backend image that does not meet the requirement is subjected to the foregoing series of processing to correct the color of the dark area.

With reference to FIG. 2 and FIG. 8, when the style transfer is performed on the first backend image and the second backend image by using the target style transfer network model, the following two implementations may be used for processing.

Figure 9:
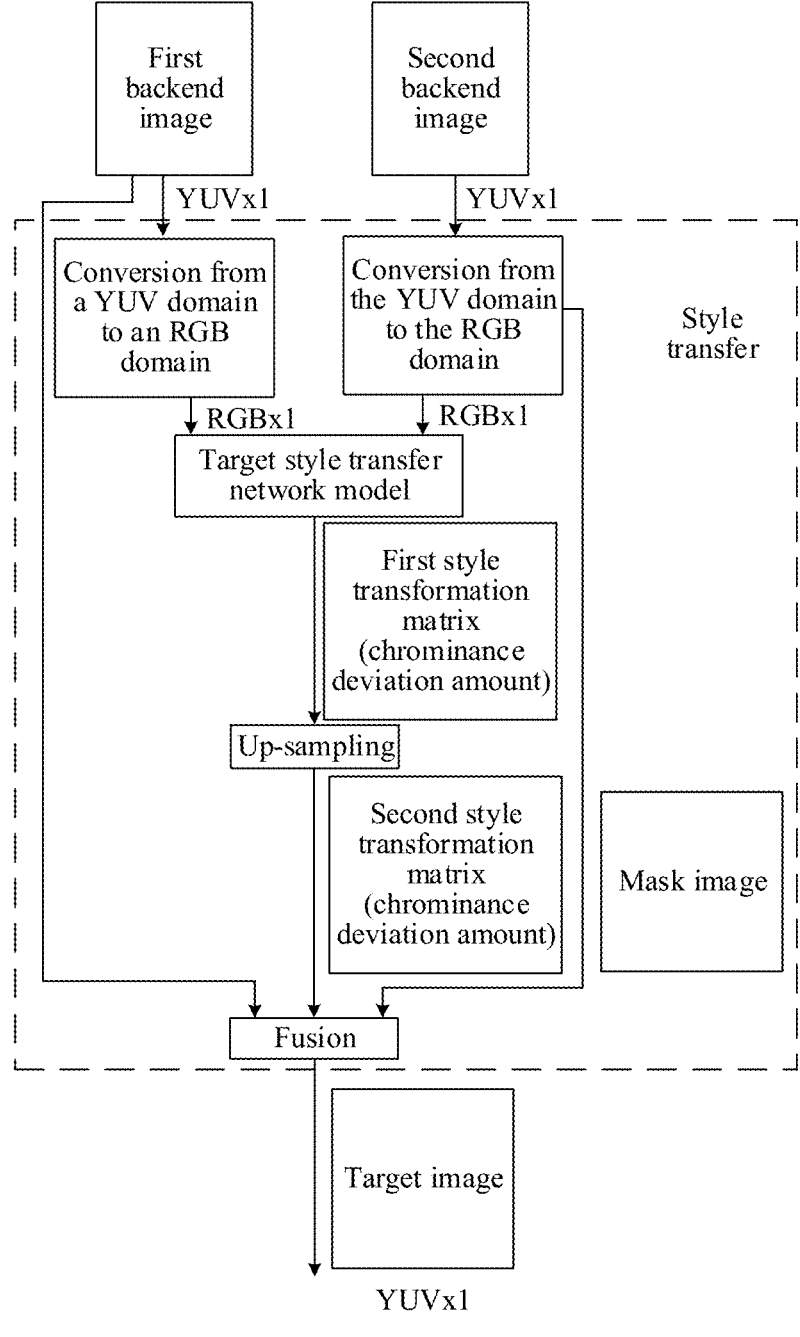
FIG. 9 is a schematic flowchart of style transfer according to an embodiment of this application.

Optionally, in an implementation, FIG. 9 is a schematic flowchart of performing style transfer on a first backend image and a second backend image. As shown in FIG. 9, the process may include S310 to S350.

S310: Separately convert the first backend image and the second backend image from a YUV domain to an RGB domain to obtain a first intermediate image corresponding to the first backend image and a second intermediate image corresponding to the second backend image.

The first backend image and the second backend image are both in the YUV domain, and the first intermediate image and the second intermediate image that are obtained through the conversion from the YUV domain to the RGB domain are both in the RGB domain.

S320: Process the first intermediate image and the second intermediate image by using the target style transfer network model to obtain a first style transformation matrix.

It should be understood that the target style transfer network model is generated through training by using a training image in the RGB domain, so that the first intermediate image and the second intermediate image in the RGB domain can be processed by using the target style transfer network model.

S330: Up-sample the first style transformation matrix to obtain a second style transformation matrix.

The up-sampling means enlarging an image, and means enlarging the original smaller-sized first style transformation matrix into the larger-sized second style transformation matrix herein. A size of the enlarged second style transformation matrix is the same as those corresponding to the first intermediate image and the second intermediate image, and sizes of the first backend image and the second backend image are the same as those of the first intermediate image and the second intermediate image. In this case, the size of the second style transformation matrix is also the same as those of the first backend image and the second backend image.

The second style transformation matrix includes chrominance deviation amounts respectively corresponding to pixels in multiple rows and columns.

It should be understood that in S320, down-sampling is performed by using the target style transfer network model to extract the first style transformation matrix, so that a size of the first style transformation matrix is reduced compared with those of the first intermediate image and the second intermediate image. For example, the sizes of the first intermediate image and the second intermediate image are $512 \times 512 \times 3$, and the size of the obtained first style transformation matrix is $16 \times 16 \times 6$. Therefore, in S330, it is necessary to up-sample the first style transformation matrix to increase the size of the first style transformation matrix, to obtain the second style transformation matrix with the same size as the first backend image, thereby facilitating subsequent processing performed on the first backend image by using the second style transformation matrix.

S340: Determine a mask image corresponding to the second intermediate image.

When the second intermediate image is obtained by processing a first long-exposure image, determining the mask image corresponding to the second intermediate image is equivalent to determining a mask image corresponding to the first long-exposure image. When the second intermediate image is obtained by processing a second long-exposure image, determining the mask image corresponding to the second intermediate image is equivalent to determining a mask image corresponding to the second long-exposure image.

The mask image is used to mask a dark area in the first long-exposure image or the second long-exposure image, so that bright and dark areas in the image are processed separately in subsequent style transfer. The mask image is a binary image. For example, the mask image may be generated according to a luminance value corresponding to each pixel.

For example, pixels in the second intermediate image are divided into a bright area and a dark area according to luminance values. When the mask image is generated by using a pixel in the bright area, a corresponding value is 0, in other words, the pixel is white in the mask image. When the mask image is generated by using a pixel in the dark area, a corresponding value is 1, in other words, the pixel is black in the mask image.

S350: Fuse the first backend image, the second style transformation matrix, and the mask image to obtain a target image.

Optionally, the target image may be determined by using the following formula (1):

$$Muv(i, j) = Suv(i, j) \times [1 - N(i, j)] + Luv(i, j) \times N(i, j) \qquad \text{formula (1)}$$

Suv $(i, j)$ represents a chrominance value at a pixel position in an $i^{th}$ row and a $j^{th}$ column in the first backend image, Luv $(i, j)$ represents a chrominance deviation value at a position in an $i^{th}$ row and a $j^{th}$ column in the second style transformation matrix, N (i, j) represents that a value at a pixel position in an $i^{th}$ row and a $j^{th}$ column in the mask image is 0 or 1, and Muv (i, j) represents a target chrominance value at a pixel position in an $i^{th}$ row and a $j^{th}$ column in the target image.

On this basis, a weight may be added based on the formula (1), and the target image is determined by using a formula (2):

$$Muv(i, j) = axSuv(i, j) \times [1 - N(i, j)] + bxLuv(i, j) \times N(i, j) \quad \text{formula (2)}$$

a represents a first weight assigned to the first backend image, and b represents a second weight assigned to the second style transformation matrix. Based on this, proportions of the original chrominance value and the chrominance deviation value can be adjusted by adjusting the weights used during fusion, to more accurately control the chrominance value of the generated target image.

It should be understood that the foregoing formula is merely used to process the chrominance value of the image to obtain the target chrominance value corresponding to the target image, and a luminance value corresponding to the target image can be determined according to a luminance value at a same position in the first backend image. For example, the luminance value corresponding to the target image may be equal to the luminance value at the same position in the first backend image. Based on this, a luminance value and a target chrominance value corresponding to each pixel in the target image can be obtained, and the target image obtained in this way is an image in the YUV domain.

In another example, if the target style transfer network model is generated through training by using a training image in the YUV domain, it is unnecessary to perform domain conversion, and the target style transfer network model can directly process the first backend image and the second backend image in the YUV domain to obtain the first style transformation matrix. Next, the first style transformation matrix is up-sampled to obtain the second style transformation matrix. Then, a mask image of the second backend image is determined. The first backend image, the second style transformation matrix, and the mask image are fused to obtain the target image.

For a specific process, refer to the descriptions in S330 to S350, and details are not described herein again.

Figure 10:
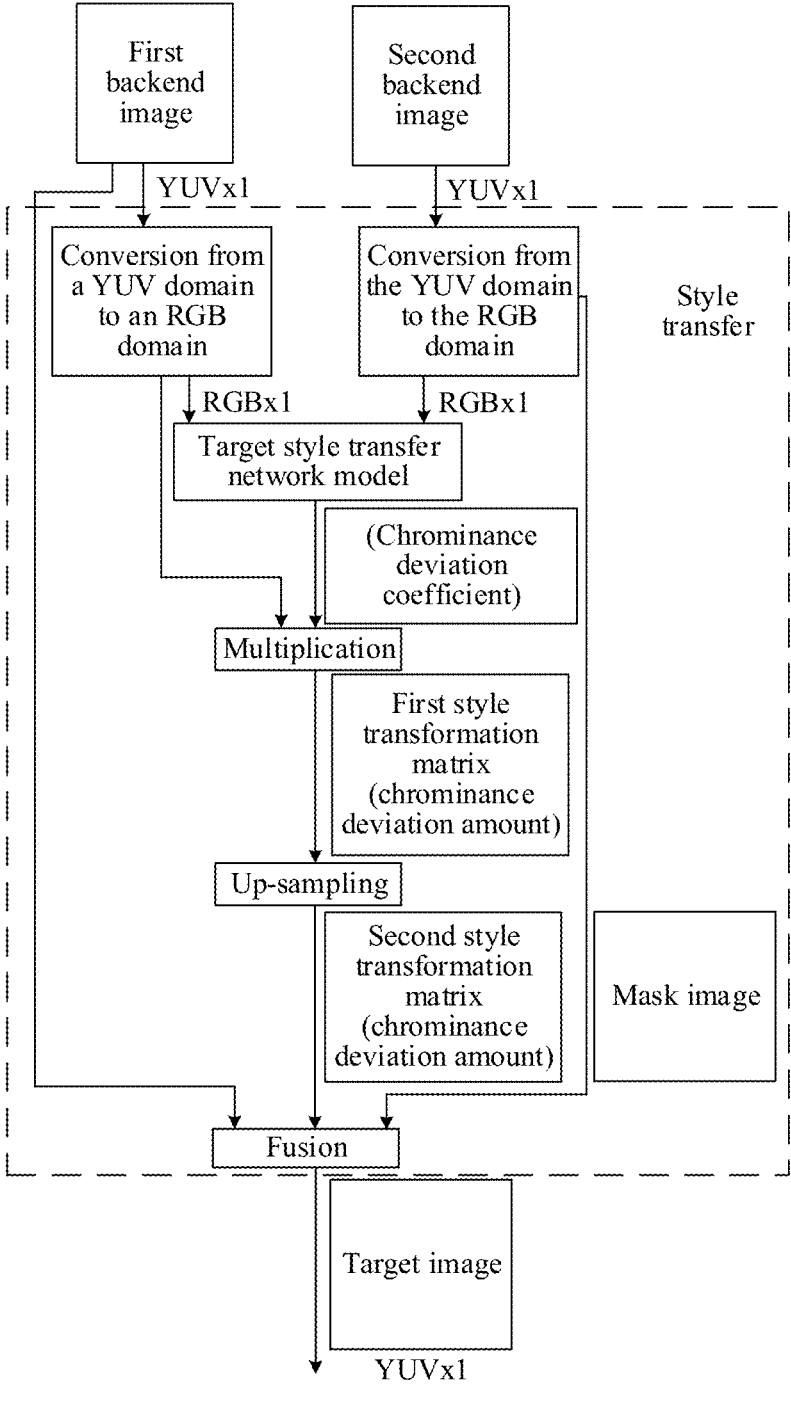
FIG. 10 is another schematic flowchart of style transfer according to an embodiment of this application.

Optionally, in another implementation, FIG. 10 is another schematic flowchart of performing style transfer on a first backend image and a second backend image. As shown in FIG. 10, the process may include S410 to S460.

S410: Separately convert the first backend image and the second backend image from a YUV domain to an RGB domain to obtain a first intermediate image corresponding to the first backend image and a second intermediate image corresponding to the second backend image.

The first backend image and the second backend image are both in the YUV domain, and the first intermediate image and the second intermediate image that are obtained through the domain conversion are both in the RGB domain.

S420: Process the first intermediate image and the second intermediate image by using a target style transfer network model to obtain a chrominance deviation coefficient.

It should be understood that the target style transfer network model is generated through training by using a training image in the RGB domain, so that the first intermediate image and the second intermediate image in the RGB domain can be processed by using the target style transfer network model.

It should be understood that the chrominance deviation coefficient represents a correspondence between luminance and a chrominance deviation value. To subsequently adjust chrominance of an image more precisely, different chrominance deviation coefficients corresponding to different areas in the image can be obtained, or different chrominance deviation coefficients corresponding to different pixel positions in the image can be obtained.

S430: Determine a first style transformation matrix according to the first intermediate image and the chrominance deviation coefficient.

The first style transformation matrix may be determined by using the following formula (3):

$$L'uv(i, j) = f[Y(i, j) * k(i, j)] \quad \text{formula (3)}$$

Y(i, j) represents a luminance value at a pixel position in an $i^{th}$ row and a $j^{th}$ column in the first intermediate image, k(i, j) represents a chrominance deviation coefficient at the position in the $i^{th}$ row and a $j^{th}$ column, L'uv (i, j) represents a chrominance deviation value at a position in an $i^{th}$ row and a $j^{th}$ column in the first style transformation matrix, and f represents that there is a function mapping relationship between Y (i, j)*k(i, j) and L'uv (i, j).

S440: Up-sample the first style transformation matrix to obtain a second style transformation matrix.

S450: Determine a mask image corresponding to the second intermediate image.

S460: Fuse the first backend image, the second style transformation matrix, and the mask image to obtain a target image.

Descriptions in steps S440 to S460 are the same as those in S330 to S350. Details are not described herein again.

In another example, if the target style transfer network model is generated through training by using a training image in a YUV domain, it is unnecessary to perform domain conversion, and the target style transfer network model can directly process the first backend image and the second backend image in the YUV domain to obtain the chrominance deviation coefficient. The first style transformation matrix is determined according to the first backend image and the chrominance deviation coefficient. The first style transformation matrix is up-sampled to obtain the second style transformation matrix. Then, a mask image of the second backend image is determined. The first backend image, the second style transformation matrix, and the mask image are fused to obtain the target image.

For a specific process, refer to the descriptions in S430 to S460, and details are not described herein again.

Figure 11:
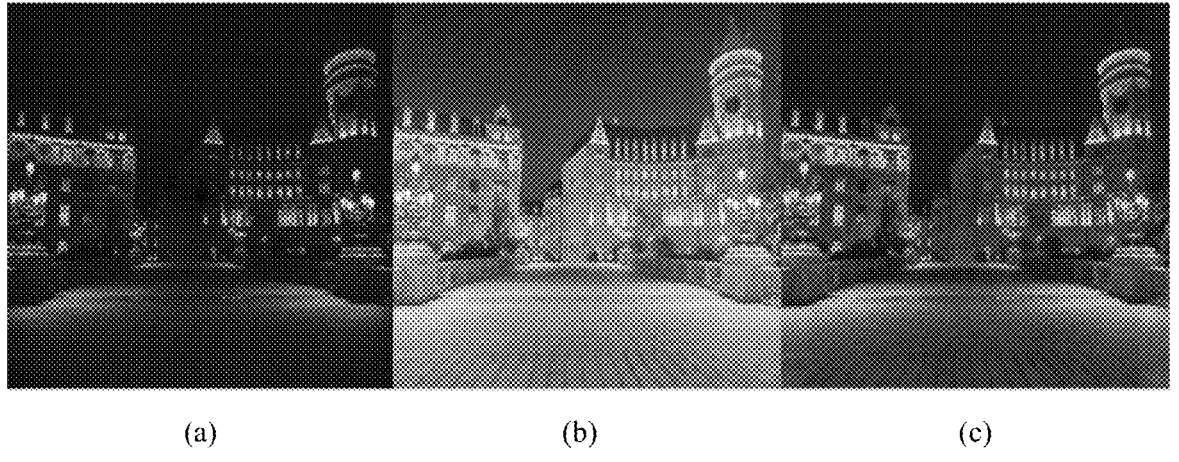
FIG. 11 is a schematic diagram of an effect according to an embodiment of this application.

FIG. 11 is a schematic diagram of an effect according to an embodiment of this application.

In a night environment with low illumination, if a conventional image processing method is used, a first fused image as shown in (a) in FIG. 11 may be obtained after a plurality of frames of exposure images are captured and fused. In this case, due to the low illumination, a dark area of the first fused image is large, and a problem of color cast occurs on the sky, ground, and the like in the dark area in the first fused image. This leads to very bad user experience.

However, after one frame of long-exposure image as shown in (b) in FIG. 11 is reused or re-captured, and the image processing method provided in the embodiments of this application is used to process the first fused image and the long-exposure image, a target image as shown in (c) in FIG. 11 can be obtained. In this case, because exposure time of the long-exposure image is longer than that of the plurality of frames of exposure images for obtaining the first fused image, a color of a real scene can be well restored, so that style transfer can be effectively achieved to transfer a style of the long-exposure image to the target image, thereby improving a color restoration effect of the target image.

With reference to FIG. 1 to FIG. 11, the foregoing describes the image processing method provided in the embodiments of this application and related display interface and effect diagrams in detail. With reference to FIG. 12 to FIG. 15, the following describes an electronic device, an apparatus, and a chip provided in the embodiments of this application in detail. It should be understood that the electronic device, the apparatus, and the chip in the embodiments of this application may perform various image processing methods in the foregoing embodiments of this application. In other words, for specific work processes of the following various products, refer to corresponding processes in the foregoing method embodiments.

Figure 12:
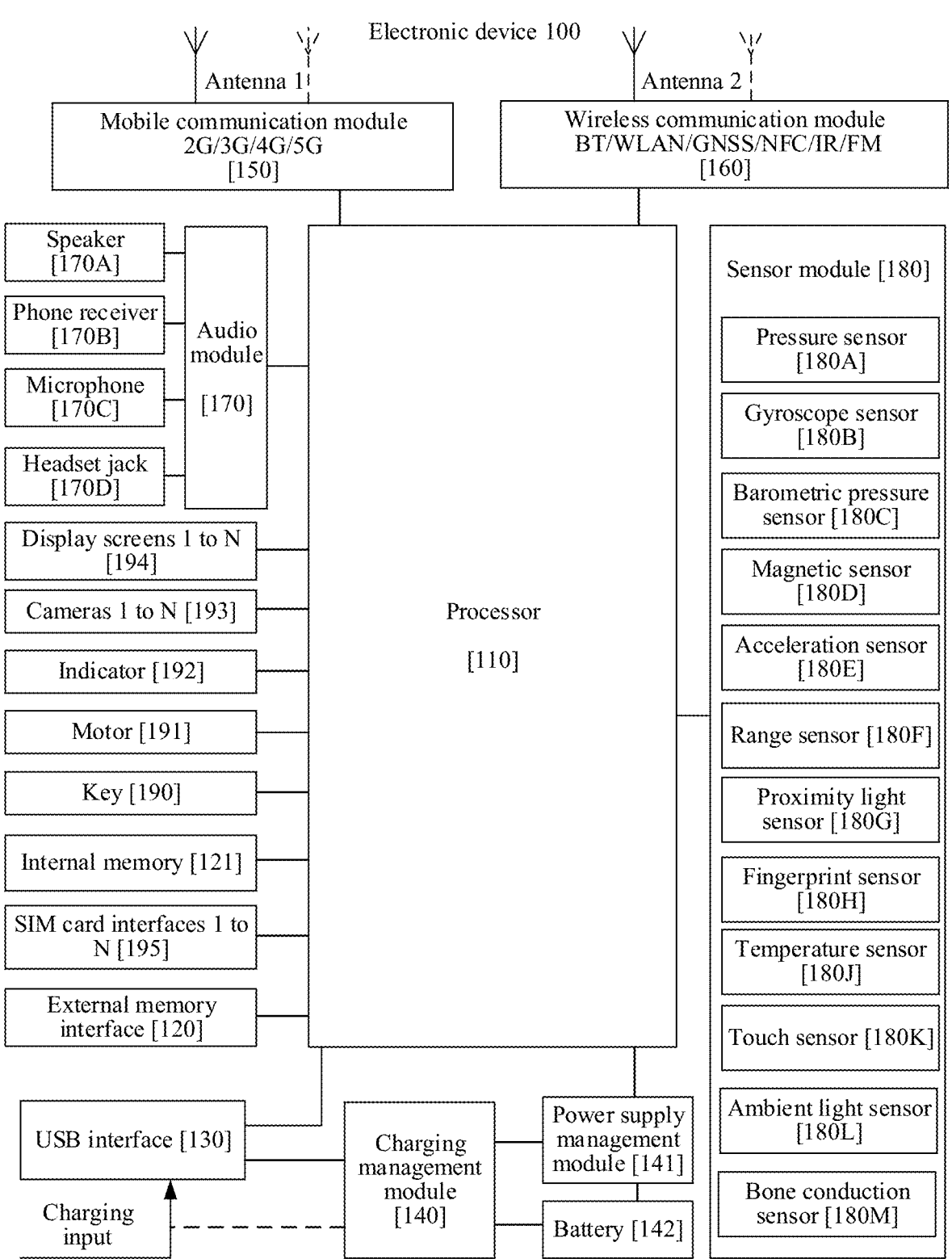
FIG. 12 is a schematic diagram of a hardware system of an electronic device applicable to this application.

FIG. 12 is a schematic structural diagram of an electronic device applicable to this application. The electronic device 100 may be configured to implement the methods described in the foregoing method embodiments.

The electronic device 100 may be a mobile phone, a smart screen, a tablet computer, a wearable electronic device, a vehicle-mounted electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like, and a specific type of the electronic device 100 is not limited in this embodiment of this application.

The electronic device 100 may include: a processor 110, an external memory interface 120, an internal memory 121, a universal serial bus (universal serial bus, USB) interface 130, a charging management module 140, a power supply management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components, or may be integrated components.

The controller may generate an operation control signal according to instruction operation code and a time-sequence signal, and control instruction obtaining and execution.

A memory may also be disposed in the processor 110, and is configured to store instructions and data. In some embodiments, the memory in the processor 110 is a cache memory. The memory may store an instruction or data recently used or cyclically used by the processor 110. If the processor 110 needs to use the instruction or the data again, the processor 110 may directly call the instruction or the data from the memory. This avoids repeated access, and reduces waiting time of the processor 110, thereby improving system efficiency.

A connection relationship between the modules shown in FIG. 12 is only schematically described, and does not constitute a limitation on a connection relationship between the modules of the electronic device 100. Optionally, the modules of the electronic device 100 may use a combination of a plurality of connection manners in the foregoing embodiment.

A wireless communication function of the electronic device 100 may be implemented by using the antenna 1, the antenna 2, the mobile communication module 150, the wireless communication module 160, the modem processor, the baseband processor, and the like.

The electronic device 100 implements a display function by using the GPU, the display screen 194, the application processor, and the like. The GPU is a microprocessor for image processing, and is connected to the display screen 194 and the application processor. The GPU is configured to execute mathematical and geometric calculations, and is used for graphics render. The processor 110 may include one or more GPUs that execute a program instruction to generate or change display information.

The display screen 194 is configured to display an image, a video, and the like.

The camera 193 is configured to capture an image or a video. The camera 193 may be triggered to be on by using an application instruction, to implement a shooting function, for example, capturing an image in any scene. The camera may include an imaging lens, a filter, an image sensor, and another component. Light emitted or reflected by an object enters the imaging lens, passes through the filter, and finally converges on the image sensor. The image sensor is mainly configured to converge light emitted or reflected by all objects (which may also be referred to as a scene to be shot or a target scene, and may also be understood as a scene image that a user expects to capture) in a camera angle for imaging. The filter is mainly configured to filter out a redundant light wave (for example, a light wave other than visible light, such as infrared) in the light. The image sensor is mainly configured to perform optical-to-electrical conversion on a received optical signal to obtain an electrical signal, and input the electrical signal to the processor 130 for subsequent processing. The camera 193 may be in the front of the electronic device 100 or on the back of the electronic device 100, and a specific quantity and arrangement of cameras may be set according to a requirement. This is not limited in this application.

The internal memory 121 may be configured to store computer-executable program code. The executable program code includes instructions. The internal memory 121 may include a program storage area and a data storage area. The program storage area may store an operating system, an application required by at least one function (such as a sound playback function and an image playback function), and the like. The data storage area may store data (such as audio data and an address book) and the like created when the electronic device 100 is used. In addition, the internal memory 121 may include a high-speed random access memory, and may also include a non-volatile memory, for example, at least one magnetic disk storage device, a flash memory device, or a universal flash storage (universal flash storage, UFS). The processor 110 runs the instruction stored in the internal memory 121, and/or the instruction stored in the memory disposed in the processor, to perform various function applications and data processing of the electronic device 100.

The internal memory 121 may also store software code for the image processing method provided in the embodiments of this application. When running the software code, the processor 110 performs the steps in the procedure for the image processing method, to obtain a high-definition image.

The internal memory 121 may also store a captured image.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music are stored in the external storage card.

Certainly, the software code for the image processing method provided in the embodiments of this application may alternatively be stored in the external memory. The processor 110 may run the software code through the external memory interface 120, to perform the steps in the procedure for the image processing method, thereby obtaining a high-definition image. The image captured by the electronic device 100 may alternatively be stored in the external memory.

It should be understood that a user may designate whether the image is to be stored in the internal memory 121 or the external memory. For example, when the electronic device 100 is currently connected to the external memory, if the electronic device 100 captures one frame of image, prompt information may pop up to remind the user whether to store the image in the external memory or the internal memory. Certainly, there may be another designation manner. This is not limited in this embodiment of this application. Alternatively, when detecting that an internal storage amount of the internal memory 121 is less than a preset amount, the electronic device 100 may automatically store the image in the external memory.

The electronic device 100 may implement audio functions through the audio module 170, the speaker 170A, the phone receiver 170B, the microphone 170C, the headset jack 170D, the application processor, and the like. For example, the audio functions are music playing and recording.

In this embodiment of this application, the camera 193 may capture a plurality of frames of exposure images. The processor 110 performs image processing on the plurality of frames of exposure images, where the image processing may include noise reduction, dynamic range control, tone mapping, domain conversion, up-sampling, fusion, and the like. A target image with a better color effect can be obtained through the image processing. Then, the processor 110 may control the display screen 194 to present the processed target image, where the target image is an image captured in a scene with low illumination.

A hardware system of the electronic device 100 is described in detail above, and a software system of the electronic device 100 is described below. The software system may be in a hierarchical architecture, an event driven architecture, a microcore architecture, a microservice architecture, or a cloud architecture. The hierarchical architecture is used as an example in the embodiments of this application to describe an example of the software system of the electronic device 100.

Figure 13:
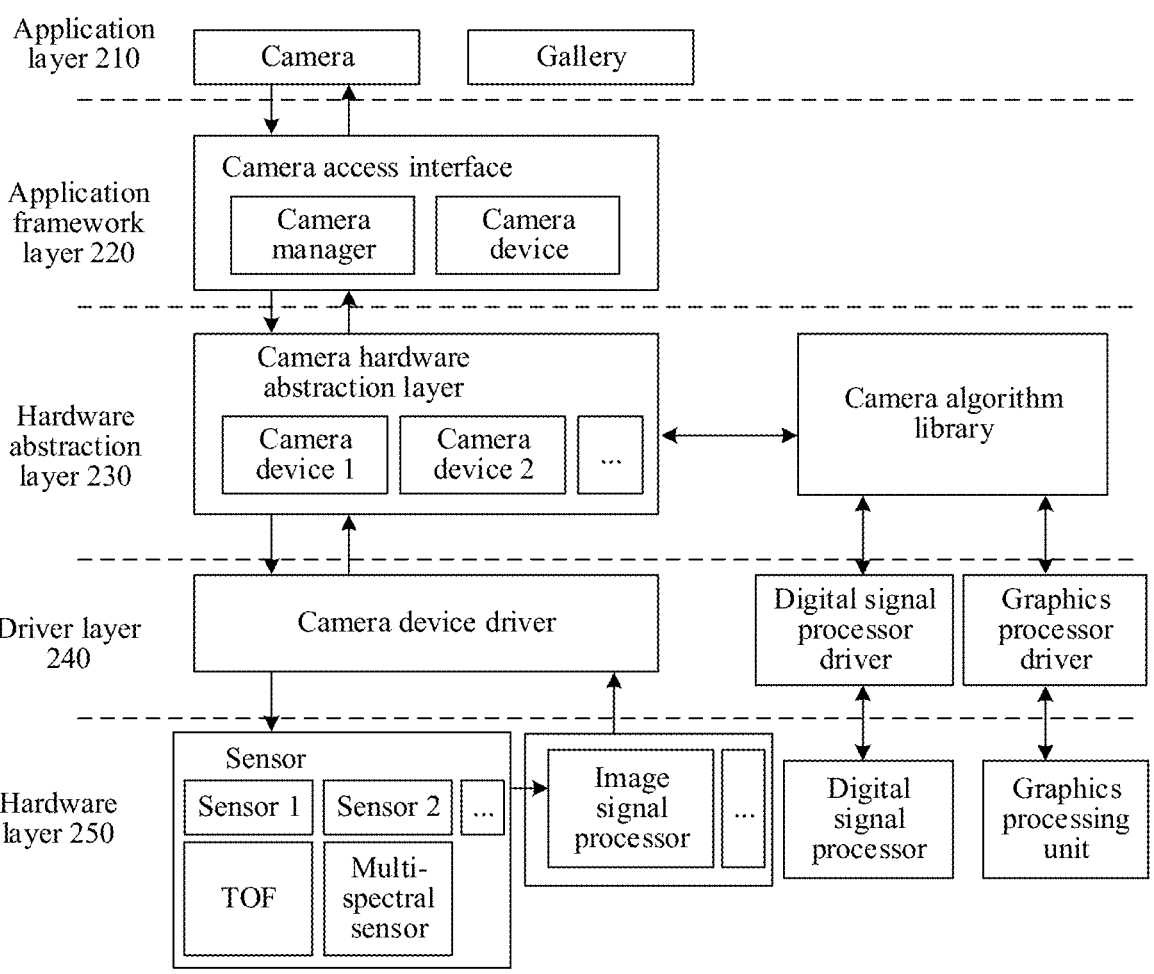
FIG. 13 is a schematic diagram of a software system of an electronic device applicable to this application.

As shown in FIG. 13, the software system in the hierarchical architecture is divided into several layers, and each layer has a clear role and task. Layers communicate with each other through a software interface. In some embodiments, the software system may be divided into five layers that are respectively an application layer 210, an application framework layer 220, a hardware abstraction layer 230, a driver layer 240, and a hardware layer 250 from top to bottom.

The application layer 210 may include camera and gallery, and may further include applications such as calendar, phone, maps, navigation, WLAN, Bluetooth, music, videos, and SMS messages.

The application framework layer 220 provides an application access interface and a programming framework for the applications at the application layer 210.

For example, the application framework layer includes a camera access interface for providing a camera shooting service through a camera manager and a camera device.

The camera manager at the application framework layer 220 is configured to manage the camera. The camera manager can obtain a parameter of the camera, for example, determine a working state of the camera.

The camera device at the application framework layer 220 is configured to provide a data access interface between the camera device and the camera manager.

The hardware abstraction layer 230 is used to abstract hardware. For example, the hardware abstraction layer may include a camera hardware abstraction layer and another hardware device abstraction layer. The camera hardware abstraction layer may include a camera device 1, a camera device 2, and the like. The camera hardware abstraction layer may be connected to a camera algorithm library, and may call an algorithm in the camera algorithm library.

The driver layer 240 is used to provide drivers for different hardware devices. For example, the driver layer may include a camera driver, a digital signal processor driver, and a graphics processor driver.

The hardware layer 250 may include a sensor, an image signal processor, a digital signal processor, a graphics processor, and another hardware device. The sensor may include a sensor 1, a sensor 2, and the like, and may also include a time of flight (time of flight, TOF) sensor, a multi-spectral sensor, and the like. This is not limited in this embodiment of this application.

The following describes an example of a working process of the software system of the electronic device 100 with reference to a displaying and shooting scenario.

When a user performs a one-tap operation on the touch sensor 180K, after the camera APP is awakened by the one-tap operation, the camera APP calls each camera device at the camera hardware abstraction layer through the camera access interface. For example, the camera hardware abstraction layer may deliver an instruction for calling a specific camera to a camera device driver, and the camera algorithm library starts to load the deep learning network model and the target style transfer network model used in the embodiments of this application.

After the sensor at the hardware layer is called, for example, a sensor 1 in the specific camera is called to obtain a plurality of frames of exposure images with different exposure time, the plurality of frames of exposure images are returned to the hardware abstraction layer, and the deep learning network model in the loaded camera algorithm library is used for noise reduction, multiexpo fusion, and other processing to generate a first fused image. Then, the image signal processor is called to perform dynamic range control, tone mapping, conversion from an RGB domain to a YUV domain, and the like on the first fused image, and the image processor is called to perform conversion from the RGB domain to the YUV domain on a reused first long-exposure image or an additionally captured second long-exposure image. Next, the target style transfer network model in the loaded camera algorithm library is used for style transfer to obtain a target image.

The obtained target image is sent back to the camera application through the camera hardware abstraction layer and the camera access interface for display and storage.

An apparatus embodiment of this application is described in detail below with reference to FIG. 14. It should be understood that an apparatus in this embodiment of this application may perform various methods in the foregoing embodiments of this application. In other words, for specific work processes of the following various products, refer to corresponding processes in the foregoing method embodiments.

Figure 14:
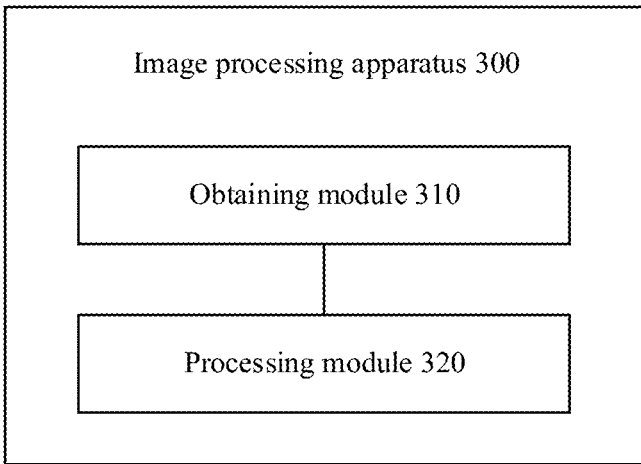
FIG. 14 is a schematic structural diagram of an image processing apparatus according to an embodiment of this application.

FIG. 14 is a schematic structural diagram of the image processing apparatus 300 according to this embodiment of this application. The image processing apparatus 300 includes an obtaining module 310 and a processing module 320.

The obtaining module 310 is configured to obtain a plurality of frames of exposure images, where exposure time of the plurality of frames of exposure images is different, the plurality of frames of exposure images include at least one frame of first long-exposure image, and exposure time of the first long-exposure image is longer than that of a remaining exposure image in the plurality of frames of exposure images.

The processing module 320 is configured to perform style transfer on the plurality of frames of exposure images to obtain a target image.

Optionally, in an embodiment, the processing module 320 is further configured to:

process the plurality of frames of exposure images by using a deep learning network model to obtain a first fused image; and perform first backend processing on the first fused image to obtain a first backend image.

Optionally, in an embodiment, the processing module 320 is further configured to:

perform second backend processing on the first long-exposure image to obtain a second backend image.

Optionally, in an embodiment, the processing module 320 is further configured to:

obtain a second long-exposure image, where exposure time of the second long-exposure image is longer than that of a remaining exposure image other than the first long-exposure image in the plurality of frames of exposure images; and perform second backend processing on the second long-exposure image to obtain a second backend image.

Optionally, in an embodiment, the processing module 320 is further configured to:

perform style transfer on the first backend image and the second backend image by using a target style transfer network model to obtain the target image.

Optionally, in an embodiment, the processing module 320 is further configured to:

determine whether an ambient luminance value corresponding to the first backend image is less than a preset ambient luminance value; and if no, output the first backend image as the target image; or if yes, perform style transfer on the first backend image and the second backend image by using the target style transfer network model to obtain the target image.

Optionally, in an embodiment, the processing module 320 is further configured to:

process the first backend image and the second backend image by using the target style transfer network model to obtain a first style transformation matrix;

up-sample the first style transformation matrix to obtain a second style transformation matrix;

determine a mask image corresponding to the second backend image; and fuse the first backend image, the second style transformation matrix, and the mask image to obtain the target image.

Optionally, in an embodiment, the processing module 320 is further configured to:

process the first backend image and the second backend image by using the target style transfer network model to obtain a chrominance deviation coefficient; and determine the first style transformation matrix according to the first backend image and the chrominance deviation coefficient.

Optionally, in an embodiment, the processing module 320 is further configured to:

separately convert the first backend image and the second backend image from a YUV domain to an RGB domain; and the processing the first backend image and the second backend image by using the target style transfer network model includes:

processing, by using the target style transfer network model, the first backend image and the second backend image that have been converted from the YUV domain to the RGB domain.

Optionally, in an embodiment, the processing module 320 is further configured to:

train an initial style transfer network model by using a plurality of pairs of training images to determine the target style transfer network model, where the plurality of pairs of training images are all in the RGB domain, and each pair of training images has same content but different colors corresponding to dark areas.

Optionally, in an embodiment, the processing module 320 is further configured to:

train an initial style transfer network model by using a plurality of pairs of training images to determine the target style transfer network model, where the plurality of pairs of training images are all in a YUV domain, and each pair of training images has same content but different colors corresponding to dark areas.

Optionally, in an embodiment, the processing module 320 is further configured to:

process each frame of training image in each pair of training images by using one feature network model to obtain a corresponding feature map; and train the initial style transfer network model by using two feature maps corresponding to each pair of training images, to obtain the target style transfer network model.

Optionally, in an embodiment, the processing module 320 is further configured to:

splice two frames of training images included in each pair of training images to obtain a spliced training image;

process the spliced training image by using a feature network model to obtain a corresponding spliced feature map; and train the initial style transfer network model by using the spliced feature map to obtain the target style transfer network model.

Optionally, in an embodiment, the deep learning network model is any one of a Unet model, an LLnet model, and an FCN model.

Optionally, in an embodiment, the first backend processing includes: conversion from an RGB domain to a YUV domain.

Optionally, in an embodiment, the first backend processing further includes: at least one of dynamic range control and tone mapping.

Optionally, in an embodiment, the second backend processing includes: conversion from a RAW domain to a YUV domain.

Optionally, in an embodiment, the target style transfer network model is any one of a ResNet model, a VGG model, a Unet model, and a Vnet model.

It should be noted that the image processing apparatus 300 is reflected in a form of functional modules. The term "module" herein may be implemented in a form of software and/or hardware. This is not specifically limited.

For example, the "module" may be a software program or a hardware circuit that implements the foregoing functions, or a combination thereof. The hardware circuit may include an application specific integrated circuit (application specific integrated circuit, ASIC), an electronic circuit, a processor (for example, a shared processor, a dedicated processor, or a packet processor) configured to execute one or more software or firmware programs and a memory, a combined logic circuit, and/or another suitable component that supports the described functions.

Therefore, the units in the examples described in the embodiments of this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

An embodiment of this application further provides a computer-readable storage medium, where the computer-readable storage medium stores computer instructions. When the computer-readable storage medium runs on an apparatus for determining a foldable screen included angle, the image processing apparatus 300 is caused to perform the foregoing image processing method.

The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium, or a semiconductor medium (for example, a solid state disk (solid state disk, SSD)), or the like.

An embodiment of this application further provides a computer program product including computer instructions. When the computer program product runs on the image processing apparatus 300, the image processing apparatus 300 is caused to perform the foregoing image processing method.

Figure 15:
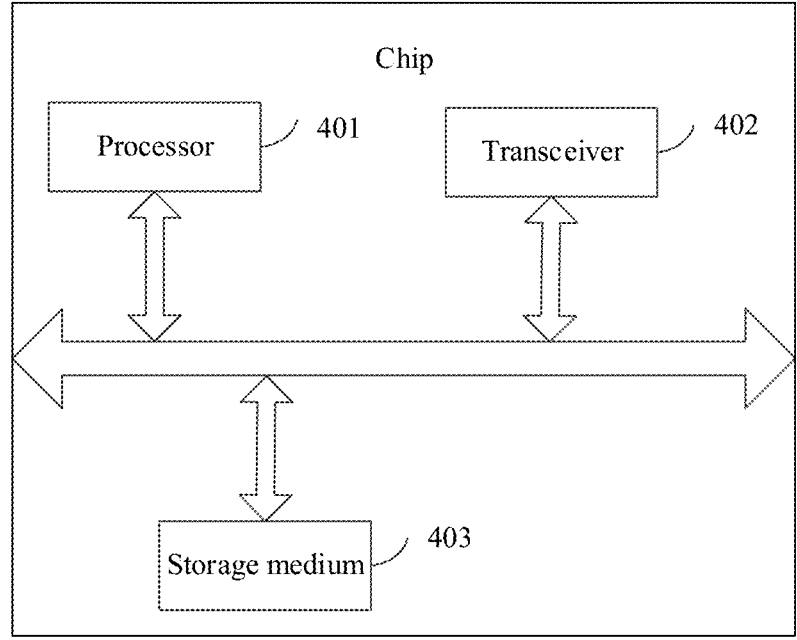
FIG. 15 is a schematic structural diagram of a chip according to an embodiment of this application.

FIG. 15 is a schematic structural diagram of a chip according to an embodiment of this application. The chip shown in FIG. 15 may be a general-purpose processor, or may be a special-purpose processor. The chip includes a processor 401. The processor 401 is configured to support the image processing apparatus 300 in performing the foregoing technical solution.

Optionally, the chip further includes a transceiver 402. The transceiver 402 is configured to accept control of the processor 401 to support the image processing apparatus 300 in performing the foregoing technical solution.

Optionally, the chip shown in FIG. 15 may further include: a storage medium 403.

It should be noted that the chip shown in FIG. 15 may be implemented by the following circuit or component: one or more field programmable gate arrays (field programmable gate array, FPGA), a programmable logic device (programmable logic device, PLD), a controller, a state machine, a gate logic, a discrete hardware part, any other appropriate circuit, or any combination of circuits capable of executing various functions described throughout this application.

The electronic device, the image processing apparatus 300, the computer storage medium, the computer program product, and the chip provided in the foregoing embodiments of this application are all configured to perform the method provided above. Therefore, for beneficial effects that can be achieved by the electronic device, the image processing apparatus 300, the computer storage medium, the computer program product, and the chip, refer to the beneficial effects corresponding to the method provided above. Details are not described herein again.

It should be understood that the foregoing descriptions are intended to help a person skilled in the art to better understand the embodiments of this application, but not to limit the scope of the embodiments of this application. A person skilled in the art obviously may perform various equivalent modifications or changes according to the given examples. For example, some steps in the embodiments of the foregoing detection method may be unnecessary, some steps may be newly added, or any two or more of the foregoing embodiments may be combined. A modified, changed or combined solution also falls within the scope of the embodiments of this application.

It should be further understood that the foregoing descriptions of the embodiments of this application emphasize differences between the embodiments. For the same or similar descriptions not mentioned, reference may be made to each other. For brevity, details are not described herein again.

It should be further understood that sequence numbers of the foregoing processes do not indicate an execution sequence, and an execution sequence of processes shall be determined based on functions and internal logic thereof, and shall constitute no limitation on an implementation process of the embodiments of this application.

It should be further understood that in the embodiments of this application, "preset" and "pre-define" may be realized by pre-storing corresponding code and tables in a device (such as an electronic device) or in another manner for indicating related information. A specific implementation thereof is not limited in this application.

It should be further understood that classification of manners, cases, categories, and embodiments in the embodiments of this application merely aims to facilitate description rather than constituting specific limitations, and characteristics in various manners, categories, cases, and embodiments may be combined without contradictions.

It should be further understood that in the embodiments of this application, unless otherwise specified and there is a logical conflict, terms and/or descriptions in different embodiments are consistent and may be referenced by each other. Technical features in different embodiments may be combined based on an internal logical relationship thereof to form a new embodiment.

Finally, it should be noted that, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, wherein the method comprises:
displaying a first interface, wherein the first interface comprises a first control;
detecting a first operation on the first control;
obtaining a plurality of frames of exposure images in response to detecting the first operation, wherein exposure times of the plurality of frames of exposure images are different, the plurality of frames of exposure images comprises at least one frame of a first long-exposure image, and an exposure time of the first long-exposure image is longer than that of a remaining exposure image in the plurality of frames of exposure images;
processing the plurality of frames of exposure images by using a deep learning network model to obtain a first fused image;
performing first backend processing on the first fused image to obtain a first backend image;
performing second backend processing on the first long-exposure image to obtain a second backend image; and
performing style transfer on the plurality of frames of exposure images to obtain a target image.

2. The method according to claim 1, wherein performing style transfer on the plurality of frames of exposure images to obtain the target image comprises:
performing style transfer on the first backend image and the second backend image by using a target style transfer network model to obtain the target image.

3. The method according to claim 2, wherein performing style transfer on the first backend image and the second backend image by using the target style transfer network model to obtain the target image comprises:
processing the first backend image and the second backend image by using the target style transfer network model to obtain a first style transformation matrix;
up-sampling the first style transformation matrix to obtain a second style transformation matrix;
determining a mask image corresponding to the second backend image; and
fusing the first backend image, the second style transformation matrix, and the mask image to obtain the target image.

4. The method according to claim 3, wherein processing the first backend image and the second backend image by using the target style transfer network model to obtain the first style transformation matrix comprises:
processing the first backend image and the second backend image by using the target style transfer network model to obtain a chrominance deviation coefficient; and
determining the first style transformation matrix according to the first backend image and the chrominance deviation coefficient.

5. The method according to claim 4, further comprising:
separately converting the first backend image and the second backend image from a YUV domain to an red green blue (RGB) domain; and
wherein processing the first backend image and the second backend image by using the target style transfer network model comprises:
processing, by using the target style transfer network model, the first backend image and the second backend image that have been converted from the YUV domain to the RGB domain.

6. The method according to claim 5, further comprising:
training an initial style transfer network model by using a plurality of pairs of training images to determine the target style transfer network model, wherein the plurality of pairs of training images are all in the RGB domain, and each pair of training images has same content but different colors corresponding to dark areas.

7. The method according to claim 4, further comprising:
training an initial style transfer network model by using a plurality of pairs of training images to determine the target style transfer network model, wherein the plurality of pairs of training images are all in a YUV domain, and each pair of training images has same content but different colors corresponding to dark areas.

8. The method according to claim 6, wherein training the initial style transfer network model by using the plurality of pairs of training images to determine the target style transfer network model comprises:
processing each frame of training image in each pair of training images by using one feature extraction network model to obtain a corresponding feature map; and
training the initial style transfer network model by using two feature maps corresponding to each pair of training images, to obtain the target style transfer network model.

9. The method according to claim 6, wherein training the initial style transfer network model by using the plurality of pairs of training images to determine the target style transfer network model comprises:
splicing two frames of training images comprised in each pair of training images to obtain a spliced training image;
processing the spliced training image by using a feature extraction network model to obtain a corresponding spliced feature map; and
training the initial style transfer network model by using the spliced feature map to obtain the target style transfer network model.

10. The method according to claim 8, wherein the feature extraction network model is any one of a ResNet model, a VGG model, or a MobileNet model.

11. The method according to claim 1, wherein the deep learning network model is any one of a Unet model, an LLnet model, or an FCN model.

12. The method according to claim 1, wherein the first backend processing comprises: conversion from an RGB domain to a YUV domain.

13. The method according to claim 12, wherein the first backend processing further comprises: at least one of dynamic range control or tone mapping.

14. The method according to claim 2, wherein the target style transfer network model is any one of a ResNet model, a VGG model, a Unet model, or a Vnet model.

15. An electronic device, comprising:

one or more processors and a memory, wherein the memory is coupled to the one or more processors, the memory stores computer program code, the computer program code comprises computer instructions, and the one or more processors invoke the computer instructions to cause the electronic device to:

display a first interface, wherein the first interface comprises a first control;

detect a first operation on the first control;

obtain a plurality of frames of exposure images in response to detecting the first operation, wherein exposure times of the plurality of frames of exposure images are different, the plurality of frames of exposure images comprise at least one frame of first long-exposure image, and an exposure time of the first long-exposure image is longer than that of a remaining exposure image in the plurality of frames of exposure images;

processing the plurality of frames of exposure images by using a deep learning network model to obtain a first fused image;

performing first backend processing on the first fused image to obtain a first backend image;

obtaining a second long-exposure image, wherein exposure time of the second long-exposure image is longer than that of the remaining exposure image other than the first long-exposure image in the plurality of frames of exposure images;

performing second backend processing on the second long-exposure image to obtain a second backend image; and perform style transfer on the plurality of frames of exposure images to obtain a target image.

16. A chip system, wherein the chip system is applied to an electronic device, the chip system comprises one or more processors, and the one or more processors are configured to invoke computer instructions to cause the electronic device to:

display a first interface, wherein the first interface comprises a first control;

detect a first operation on the first control;

obtain a plurality of frames of exposure images in response to detecting the first operation, wherein exposure times of the plurality of frames of exposure images are different, the plurality of frames of exposure images comprise at least one frame of first long-exposure image, and an exposure time of the first long-exposure image is longer than that of a remaining exposure image in the plurality of frames of exposure images;

process the plurality of frames of exposure images by using a deep learning network model to obtain a first fused image;

perform first backend processing on the first fused image to obtain a first backend image;

perform second backend processing on the first long-exposure image to obtain a second backend image; and perform style transfer on the plurality of frames of exposure images to obtain a target image.

17. The electronic device according to claim 15, wherein performing style transfer on the plurality of frames of exposure images to obtain the target image comprises:

performing style transfer on the first backend image and the second backend image by using a target style transfer network model to obtain the target image.

18. The electronic device according to claim 17, wherein the one or more processors invoke the computer instructions to cause the electronic device further to:

determine whether an ambient luminance value corresponding to the first backend image is less than a preset ambient luminance value; and wherein performing style transfer on the first backend image and the second backend image by using a target style transfer network model to obtain the target image comprises:

when the ambient luminance value corresponding to the first backend image is not less than the preset ambient luminance value, outputting the first backend image as the target image; or when the ambient luminance value corresponding to the first backend image is less than the preset ambient luminance value, performing style transfer on the first backend image and the second backend image by using the target style transfer network model to obtain the target image.

19. The chip system according to claim 16, wherein the deep learning network model is any one of a Unet model, an LLnet model, or an FCN model.

20. The chip system according to claim 16, wherein the first backend processing comprises: conversion from an RGB domain to a YUV domain.

* * * * *